US011972318B2

(12) United States Patent
Reilly

(10) Patent No.: US 11,972,318 B2
(45) Date of Patent: Apr. 30, 2024

(54) OPTICALLY COUPLED NITROGEN VACANCY-DEFECT SYSTEM FOR SCALABLE QUBIT ARRAYS

(71) Applicant: Second Foundation, Inc., Cambridge, MA (US)

(72) Inventor: Michele Reilly, Los Angeles, CA (US)

(73) Assignee: Second Foundation, Inc.

( * ) Notice: Subject to any disclaimer, the term of this patent is extended or adjusted under 35 U.S.C. 154(b) by 1071 days.

(21) Appl. No.: 16/388,312

(22) Filed: Apr. 18, 2019

(65) Prior Publication Data

US 2019/0325337 A1    Oct. 24, 2019

Related U.S. Application Data

(60) Provisional application No. 62/659,670, filed on Apr. 18, 2018.

(51) Int. Cl.
*G06N 10/00* (2022.01)
*G06E 1/00* (2006.01)

(52) U.S. Cl.
CPC ............... *G06N 10/00* (2019.01); *G06E 1/00* (2013.01)

(58) Field of Classification Search
CPC ............. G06N 10/00; G06E 1/00; G06E 3/00
See application file for complete search history.

(56) References Cited

U.S. PATENT DOCUMENTS

| 4,964,133 A * | 10/1990 | Pollock ................. H01S 3/1681 372/42 |
| 8,405,899 B2 * | 3/2013 | Chui .................... G02B 26/001 359/223.1 |
| 9,910,105 B2 * | 3/2018 | Boesch ................... G05D 1/101 |
| 2002/0141036 A1 * | 10/2002 | Jin ........................ B81B 3/0035 359/290 |
| 2007/0252081 A1 * | 11/2007 | Munro .................... B82Y 10/00 250/281 |
| 2008/0063339 A1 | 3/2008 | Spillane et al. |

(Continued)

OTHER PUBLICATIONS

Shikata et al., Single crystal diamond wafers for high power electronics, Mar. 18, 2016, 8 pages (Year: 2016).*

(Continued)

Primary Examiner — Omar F Fernandez Rivas
Assistant Examiner — Tri T Nguyen
(74) Attorney, Agent, or Firm — The Belles Group, P.C.

(57) ABSTRACT

Described herein are systems and methods for coupling Nitrogen Vacancy (NV)-defects in a quantum computing architecture. A diamond wafer comprises separated implantation sites, at least a portion of which comprise a single NV-defect. An optical cavity system comprises cavity sites aligned to the implantation sites. An integrated optics system includes a first chip module comprising optical waveguides and associated switchable elements, photon sources, photon detectors, and fiber optic connections. A first switchable element couples a first pair of NV-defects by splitting a beam emitted by a photon source, via a first optical waveguide, to the cavity sites aligned to the implantation sites of the first pair of NV-defects. A second switchable element couples a second pair of NV-defects by splitting a beam emitted by a photon source, via a second optical waveguide, to the cavity sites aligned to the implantation sites of the second pair of NV-defects.

14 Claims, 18 Drawing Sheets

(56) References Cited

U.S. PATENT DOCUMENTS

| | | | | |
|---|---|---|---|---|
| 2014/0270629 | A1* | 9/2014 | Dutt | G02B 6/12 |
| | | | | 385/14 |
| 2014/0306707 | A1* | 10/2014 | Walsworth | G01R 33/4616 |
| | | | | 324/309 |
| 2016/0018269 | A1* | 1/2016 | Maurer | G01K 11/20 |
| | | | | 374/121 |
| 2017/0373153 | A1* | 12/2017 | Narayan | C30B 13/06 |
| 2020/0209656 | A1* | 7/2020 | Young | H04L 9/0852 |

OTHER PUBLICATIONS

Ishikawa et al., Optical and Spin Coherence Properties of Nitrogen-Vacancy Centers Placed in a 100 nm Thick Isotopically Purified Diamond Layer, 2012, 5 pages (Year: 2012).*

Lillian Childress: "Diamond NV centers for quantum computing and quantum networks," MRS Bulletin, vol. 38, Issue 2: Nitrogen-vacancy centers: Physics and applications, Feb. 2013, pp. 134-138.

* cited by examiner

Abstract geometric layout matches the Physical layout of the chip.

Physical layout of the implanted diamond chip

OPTICALLY COUPLED NITROGEN VACANCY-DEFECT SYSTEM FOR SCALABLE QUBIT ARRAYS

RELATED APPLICATIONS

This application claims priority to U.S. Provisional Patent Application No. 62/659,670, filed on Apr. 18, 2018, the entirety of which is incorporated herein by reference.

TECHNICAL FIELD

This application relates generally to an optically coupled Nitrogen Vacancy (NV)-defect system for scalable qubit arrays, for use in quantum computing architectures.

BACKGROUND

Quantum computing refers to the field of research related to computation systems that use quantum mechanical phenomena, such as superposition and entanglement, to manipulate data. These quantum mechanical phenomena do not have analogs in the world of classical computing, and thus cannot be implemented with classical computing devices. Generally, quantum computation involves manipulation of data in the form of quantum bits or "qubits." In contrast to classical computation, where a bit of information is used to represent only one of two possible logic states (i.e., "1" or "0"), in quantum computation, a qubit can represent both logical states simultaneously. Also, the logic states of several qubits can be coupled together in which multiple quantum variables have related states irrespective of the distance between them in space or time. These properties gives rise to powerful computational parallelism. Algorithms that exploit this parallelism have been developed, e.g., for efficiently factorizing large composite integers. Therefore, it is important to develop new kinds of computing hardware that efficiently exploit the quantum mechanical phenomena to enable advanced computation operations.

SUMMARY

Therefore, what is needed are systems and methods for implementing advantageous, scalable connection geometries for optically coupled NV-defects in a quantum computing architecture. The methods and systems described herein introduce an advantageous technique for coupling defects in a quantum computing architecture to enable efficient control of the quantum architecture for performing different types of quantum computation algorithms and operations.

The invention, in one aspect, features a system for coupling Nitrogen Vacancy (NV)-defects in a quantum computing architecture. The system comprises a diamond wafer comprising a plurality of separated implantation sites, at least a portion of which comprise a single NV-defect. The system comprises an optical cavity system coupled to the diamond wafer, the optical cavity system comprising a plurality of cavity sites aligned to the separated implantation sites. The system comprises an integrated optics system coupled to the optical cavity system. The integrated optics system comprises a first chip module comprising one or more optical waveguides and one or more switchable elements associated with each optical waveguide, one or more photon sources, one or more photon detectors, and one or more fiber optic connections coupled to one or more of: one of the photon sources, one of the photon detectors, and one or more of the switchable elements. A first one of the switchable elements of the first chip module couples a first pair of single NV-defects by splitting a beam emitted by one of the photon sources, via a first one of the optical waveguides, to the cavity sites aligned to the implantation sites of the first pair of single NV-defects. A second one of the switchable elements of the first chip module couples a second pair of single NV-defects by splitting a beam emitted by one of the photon sources, via a second one of the optical waveguides, to the cavity sites aligned to the implantation sites of the second pair of single NV-defects.

Any of the above aspects can include one or more of the following features. In some embodiments, at least one of the switchable elements is a 50:50 beamsplitter and at least one of the switchable elements is an optical switch. In some embodiments, a first one of the photon detectors reads a signal reflected from the cavity sites of the optical cavity system aligned with the implantation sites of the first pair of single NV-defects and a second one of the photon detectors reads a signal reflected from the cavity sites of the optical cavity system aligned with the second pair of single NV-defects. In some embodiments, the single NV-defects of the diamond wafer are connected in a Linear Nearest Neighbor (LNN) geometry by the first chip module.

In some embodiments, the integrated optics system comprises a second chip module comprising one or more optical waveguides and one or more switchable elements associated with each optical waveguide, one or more photon sources, one or more photon detectors, and one or more fiber optic connections coupled to one or more of: one of the photon sources, one of the photon detectors, and one or more of the switchable elements, where the second chip module is oriented at 90 degrees to the first chip module. In some embodiments, the second chip module couples a third pair of single NV-defects by splitting a beam emitted by one of the photon sources, via one of the optical waveguides of the second chip module, to the cavity sites aligned to the implantation sites of the third pair of single NV-defects. In some embodiments, the single NV-defects of the diamond wafer are connected in a two-dimensional Nearest Neighbor (2DNN) geometry by the second chip module.

In some embodiments, the first chip module configures the one or more switchable elements to enable measurement of a quantum state of one or more of the plurality of NV-defects. In some embodiments, the first one of the switchable elements of the first chip module couples the first pair of adjacent separated NV-defects at a first timestep, and the second one of the switchable elements of the first chip module couples the second pair of adjacent separated NV-defects at a second timestep. In some embodiments, at least one of the cavity sites is aligned to an implantation site comprising an unusable NV-defect. In some embodiments, at least one of the cavity sites is aligned to an implantation site comprising two NV-defects.

Other aspects and advantages of the invention will become apparent from the following detailed description, taken in conjunction with the accompanying drawings, illustrating the principles of the invention by way of example only.

BRIEF DESCRIPTION OF THE DRAWINGS

The advantages of the invention described above, together with further advantages, may be better understood by referring to the following description taken in conjunction with the accompanying drawings. The drawings are not neces

DETAILED DESCRIPTION

Figure 1:
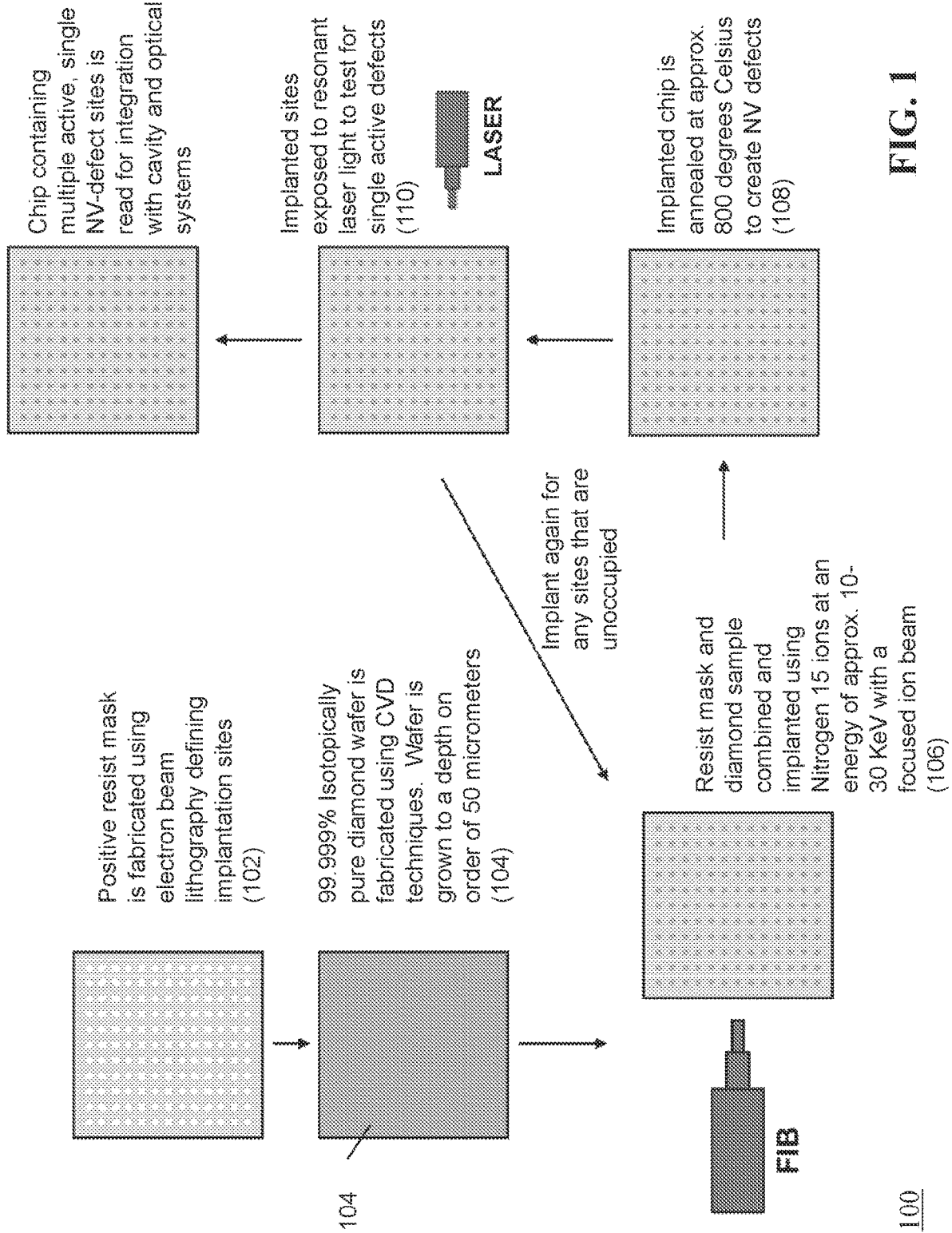
- FIG. 1 is a flow diagram of a procedure for direct ion implantation in diamond crystal to create a nitrogen defect.

The optically coupled Nitrogen Vacancy (NV) defect qubit system described herein is built from an NV color defect embedded within a diamond crystal. In some embodiments, the substrate for the NV qubit is an ultra-high purity carbon lattice forming a diamond crystal. Diamond is a metastable allotrope of carbon where each carbon atom is bonded for four neighboring carbon atoms in a variation of a face-centered cubic crystal referred known as a diamond lattice. Diamond is a well-known, naturally occurring mineral with several physical qualities that enable its use in a variety of technology. For the quantum computing system described herein, the diamond substrate requires an ultra-high purity crystal that is:

1. Free of impurities, including lattice imperfections such as missing Carbon-Carbon bonds or extraneous defects caused by other atomic impurities. The diamond lattice used as the qubit substrate should consist of an otherwise unbroken diamond lattice with all relevant sites occupied with carbon and carbon only.

2. The diamond crystal substrate should be isotopically pure. Carbon is known to exist in fifteen different isotopic varieties from C-8 to C-22, with C-12 and C-13 are known to be radioactively stable. For quantum computing applications, the diamond lattice needs to be comprised of the isotope C-12. C-12 is a net Spin 0 isotope of carbon and hence will not contribute to decoherence on each NV-qubit through environmentally induced spin flips in the diamond substrate.

It should be appreciated that naturally-occurring diamond crystals do not form an appropriate substrate for the optically coupled Nitrogen Vacancy (NV) defect qubit system described herein, as naturally-occurring diamond crystals do not satisfy the above purity criterion to a sufficient degree. Instead, the present system utilizes a technique known as Chemical Vapor Deposition (CVD) to artificially grow diamond crystals in a well-controlled environment. Using CVD, ultra-high purity diamond crystals are grown that contain no artificial defects within the lattice (atomic contamination on non-carbon atoms within the lattice) and the crystal is comprised of pure C-12 isotopes up to a level of 99.999% or above, with an epitaxially grown layer of approximately 50 micrometer thickness. These crystals are consequently appropriate diamond substrates for the NV qubit arrays of the present invention.

The NV qubit is an interstitial substitutional defect of a nitrogen nucleus within the otherwise perfect diamond lattice. The interstitial Nitrogen substitution can be chosen from the two naturally occurring, stable isotopes, N-14 or N-15. Nitrogen-14 is the most abundant isotope and consists of a Spin-1 nuclear spin state, while N-15, with a relative abundance of approximately 0.4% contains a spin ½ nuclear state. A spin ½ nuclear state forms a natural qubit (two-level quantum system), but a qutrit (three level quantum system), formed from an N-14 defect can also be used in the methods and systems described herein.

The creation of the Nitrogen defect within the diamond crystal occurs through direct ion implantation using a focused ion beam (FIB). Implantation at low ion energy allows for well-defined depth placement within the diamond crystal substrate. The implantation procedure is illustrated in FIG. 1. To achieve high transversal implantation positional accuracy, a positive resist mask is created (102) using electron beam lithography approximately 300-500 nm thick. This resist mask prevents Nitrogen atoms from entering the diamond substrate except for regions containing holes that allow Nitrogen atoms to pass through. Due to the high positional accuracy of electron beam lithography, holes in the resist mask can be made with accuracies of +−100 nm, consequently allowing for high accuracy implantation of the Nitrogen within the diamond crystal substrate. 99.999% isotopically pure diamond wafer is fabricated (104) using CVD techniques. In some embodiments, the wafer is grown to a depth on the order of 50 micrometers.

The resist mask and diamond wafer sample are combined and nitrogen 15 ions are implanted (106) at an energy of approximately 10-30 KeV with a focused ion beam (FIB), allowing for controlled implantation of between 20-50 nm below the surface of the diamond crystal substrate. For a large crystal array, each hole in the resist mask is implanted with low intensity ions with a target of one and only one Nitrogen atom implanted at each site. This implantation procedure is stochastic in several ways that are discussed below. The implantation procedure creates crystal damage as the Nitrogen atom buries itself within the crystal, hence high-temperature annealing of the crystal is then performed (108). In some embodiments, the diamond crystal is annealed at approximately 800 degrees Celsius. This allows the diamond crystal to repair the damage from the Nitrogen implantation and also allow for a lattice vacancy to move through the lattice and form a bound state next to the implanted Nitrogen—this forms the Nitrogen Vacancy (NV) center.

Once annealing is performed, photo-luminescence is used to characterize the presence or absence of an active NV center. Implanted sites are exposed to resonant laser light to test for single active defects (110).

Figure 2A:
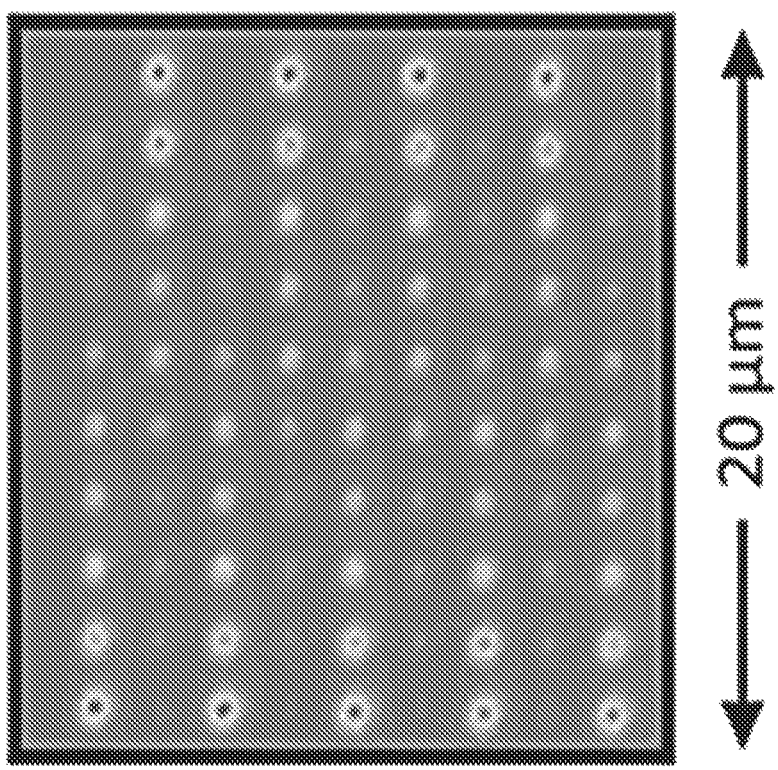
FIG. 2A is a diagram of a 20×20 micrometer array of implanted sites in a diamond crystal substrate.
Figure 2B:
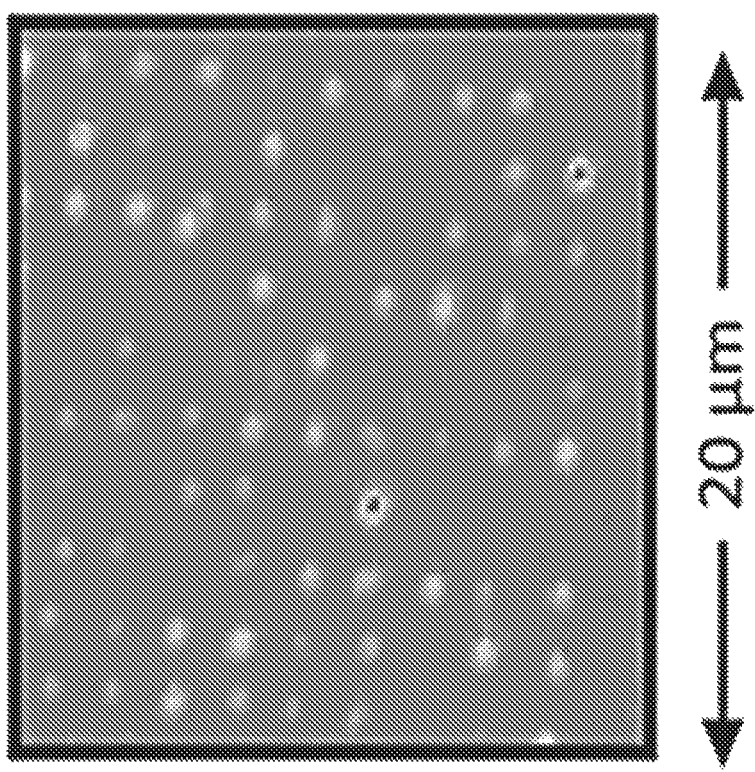
FIG. 2B is a diagram of a 20×20 micrometer array implanted with a fixed aperture size and at low ion implantation fluorescence.
Figure 2C:
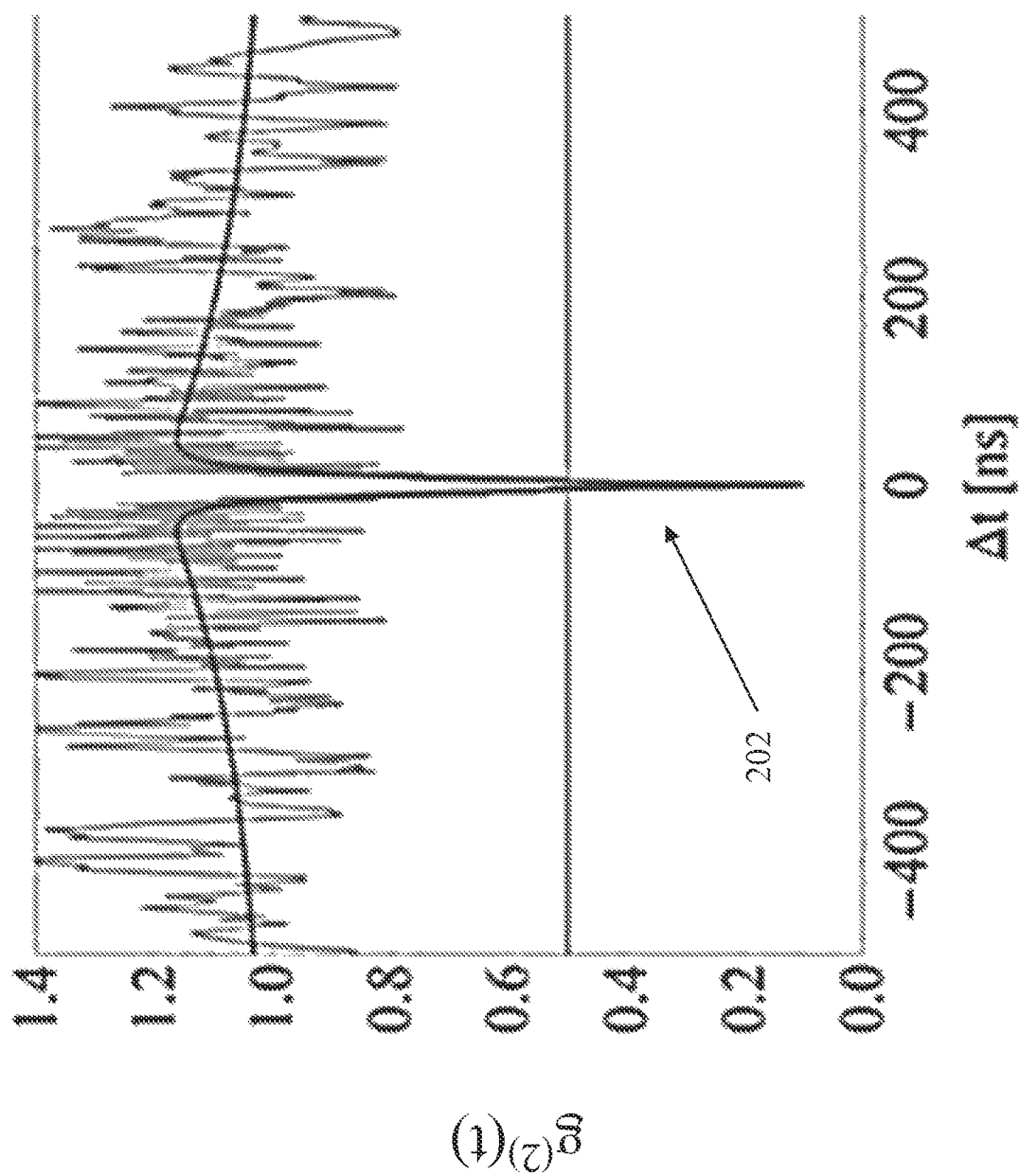
FIG. 2C is a graph depicting the g2-function.

FIGS. 2A-2C depict experimental data illustrating implantation results. FIG. 2A is a 20×20 micrometer array of implanted sites in a diamond crystal substrate. Each site is defined via the resist mask and is separated by approximately 2 micrometers. By increasing the implantation aperture size, the number of Nitrogen atoms implanted at each location can be increased. Irradiating the sample with coherent laser light at the resonance frequency of the NV-defect causes it to fluoresce, which can be measured. The brightness of each spot (e.g., brighter spots are shown in FIG. 2A as white circles with dark centers) is proportional to the number of active defects in a site. FIG. 2B is an array of the same dimensions (i.e., 20×20 micrometers) implanted with a fixed aperture size and at low ion implantation fluorescence. Again, the brightness is proportional to the number of active NV-defects within the crystal (with brighter spots shown as white circles with dark centers in FIG. 2B).

For the NV qubit architecture described herein, single NV-defects are required to be present at a site. Confirming the implantation of one, and only one, defect at a given site requires the measurement of photon-photon correlation statistics, what is known as the g2-function (as shown in FIG. 2C). By illustrating a g2 drop at a zero-time delay (e.g., 202) from a given defect illustrates that only single photons, one at a time, are emitted—thereby indicating that one and only one defect is present at the implantation site.

As mentioned above, the implantation procedure is probabilistic in multiple ways. Turning back to FIG. 2, for a given implantation site after annealing, it is first confirmed if any Nitrogen atoms have successfully been implanted. If initial fluorescence detection indicates that implantation has taken place, the site is checked to determine whether one and only one Nitrogen has been implanted. Sites that contain multiple NV-defects are now marked as 'dead' and no longer further used in the qubit chip array. For sites that remain unimplanted, steps 106, 108 and 110 are repeated for those sites until either: (a) a single NV-defect is created or (b) multiple defects are created and the site is marked as 'dead.' For example, a current process for NV-implantation typically yields 36.8% successful implantations.

Once an NV-center is successfully created, its orientation is defined as the direction along the bond axis between the Nitrogen atom and its neighboring lattice vacancy—this is known as the NV-axis. The diamond substrate forms a lattice that is tetrahedral in shape, hence there are four possible orientations for the NV-axis. The particular orientation for a given NV-defect is again stochastic. For the architecture described herein, a global magnetic field across all the qubits is used to define the computational basis states needed for the quantum computing machine. Consequently, all the defects used in the qubit chip need to have their NV-axis aligned along a common axis. This reduces the overall yield of the implanted defects by a further factor of four (as only 25% of the successfully implanted, single defect sites will have the NV axis oriented in the correct direction).

In some embodiments, the final diamond chip contains, on average, a small number of usable NV-defects compared to the number of potential sites that the diamond substrate allows. While there have been techniques developed to grow properly oriented defects within the diamond substrate, the ability to control alignment and to control the precise position of the defect within the diamond lattice makes these techniques currently insufficient for the methods and systems described herein. The low yield of usable NV-defect sites is however, not an impediment to building a large-scale quantum computing machine. Etching an appropriate mask and attempting an implantation of a diamond wafer, even with low yield, still results in a moderate number of functioning NV-defects. The optical connection structure detailed later in this document allows for the bypass of non-functional sites and create a pseudo-2D array containing all functional defects. Yield essentially provided a spatial overhead in qubit density.

The Nitrogen-Vacancy Qubit System

The NV-defect forms a pseudo two qubit system. The Nitrogen-15 nucleus itself is a spin ½ system and so naturally forms a qubit, with the spin +½ identified as the computational 0 state and the spin −½ identified with the computational 1 state (although it should be appreciated that these choices are arbitrary). Associated with the NV-defect is a bound pair of valence electrons that together form a spin-1 electronic triplet state. The energy levels of two of these states can be manipulated with external magnetic fields so that two of the three electronic states can be isolated to form an effective qubit.

Figure 3:
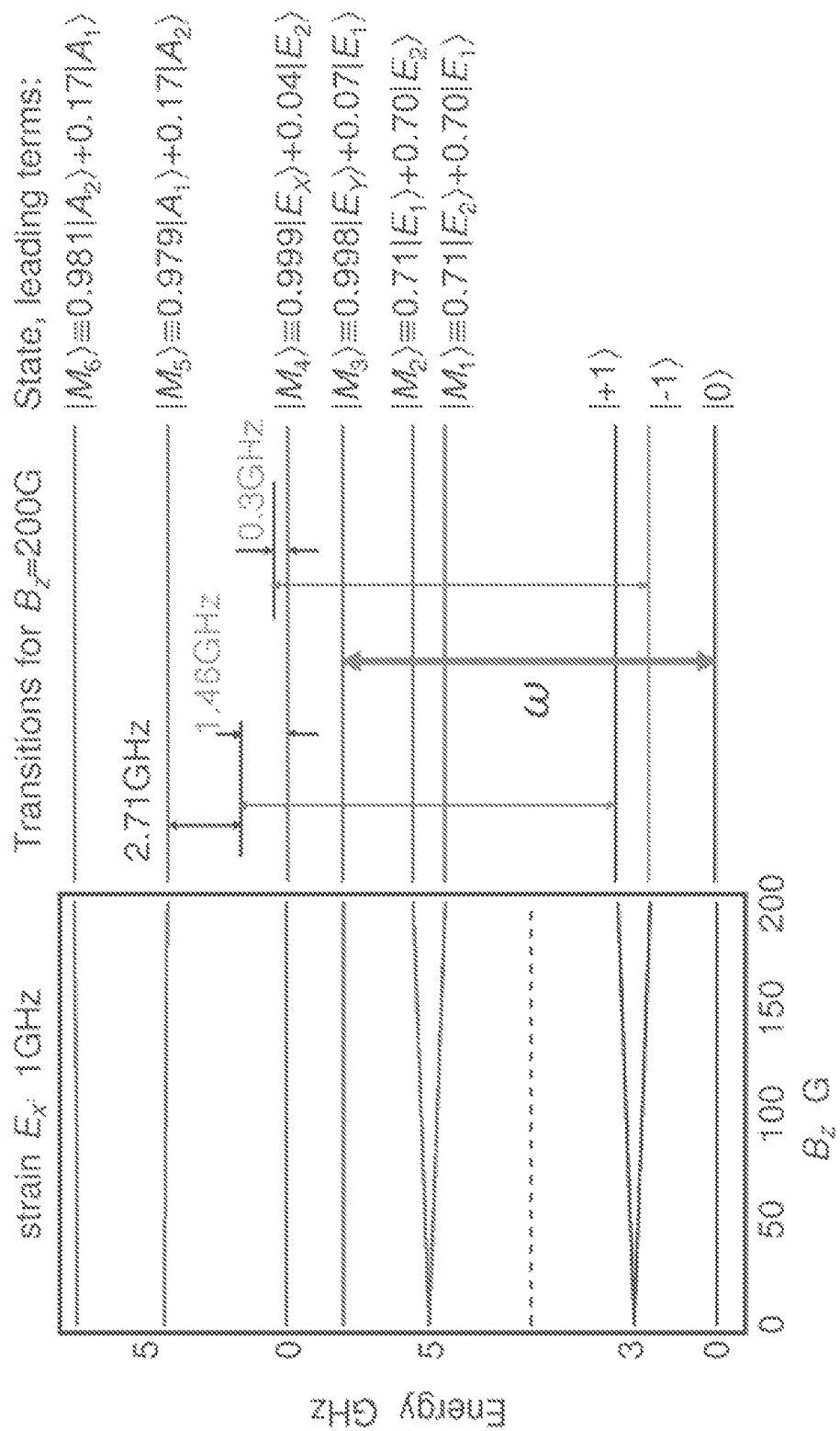
FIG. 3 is a diagram of an exemplary energy level structure of the optically coupled Nitrogen Vacancy (NV) defect system for scalable qubit arrays.

The spin-1 ground state of the electronic system of the NV-defect can be excited to higher energy manifolds. The next highest excited state manifold is separated from the ground state manifold via an optical transition of approximately 637 nm (red end of the optical spectrum). FIG. 3 is a diagram of an exemplary energy level structure of the optically coupled Nitrogen Vacancy (NV) defect system for scalable qubit arrays.

As shown in FIG. 3, the architecture is designed such that the electronic states are confined to the ground state manifold. While the optical transition is utilized to facilitate coupling of two spatially separated NV-defects, the excited state manifold is ideally never populated to avoid unwanted errors in the system. The electronic and nuclear qubits within a single NV-defect have a natural, direct coupling due to their physical proximity. Consequently, a single NV-defect contains effectively two individual qubits that can entangled together and be individually controlled. These two qubits form the basic unit of the system described herein.

The Silicon Optical Cavity

Individual NV-defects are implanted in the diamond substrate deliberately at large separations compared to the natural lattice spacing of diamond. Implantation regions are separated by approximately 2 micrometers, and diamond has a natural lattice spacing of 0.357 nanometers. Hence, implantation regions are approximately 5,600 times larger than the intrinsic length scale of the diamond substrate. This is done deliberately to ensure that each NV-defect is extremely well isolated. The ultra-high isotopic purity of the Carbon-12 lattice ensures no spin induced decoherence occurs to the NV-defect and the entire system is operated at cryogenic temperatures of approximately 4 Kelvin. This low temperature ensures thermal and phononic fluctuations that could induce decoherence is also minimized.

Due to the isolation of each NV-defect from each other, extraneous spins or thermal noise, the intrinsic decoherence of both the electronic and nuclear is suppressed to a level such that error rates are appropriate for large-scale operation of the system. Given the large-separation between individual defects, an indirect mechanism to allow entanglement between NV-defects is necessary.

This longer range connectivity is achieved via an optical coupling technique that is described in depth later in this document, but it requires coupling each NV defect to an optical cavity. Optical cavities enhance the interaction between a matter system and optical photons. An optical cavity is formed via two, highly reflective mirrors that confine a standing wave of a particular frequency of light. In the present system, one mirror of these cavities is formed from the end of an optic fiber that has been coated with a dielectric forming a mirror, while the other side is formed from a concave silicon mirror on an electrostatic, movable cantilever, as illustrated in FIGS. 4 and 5.

Figure 4:
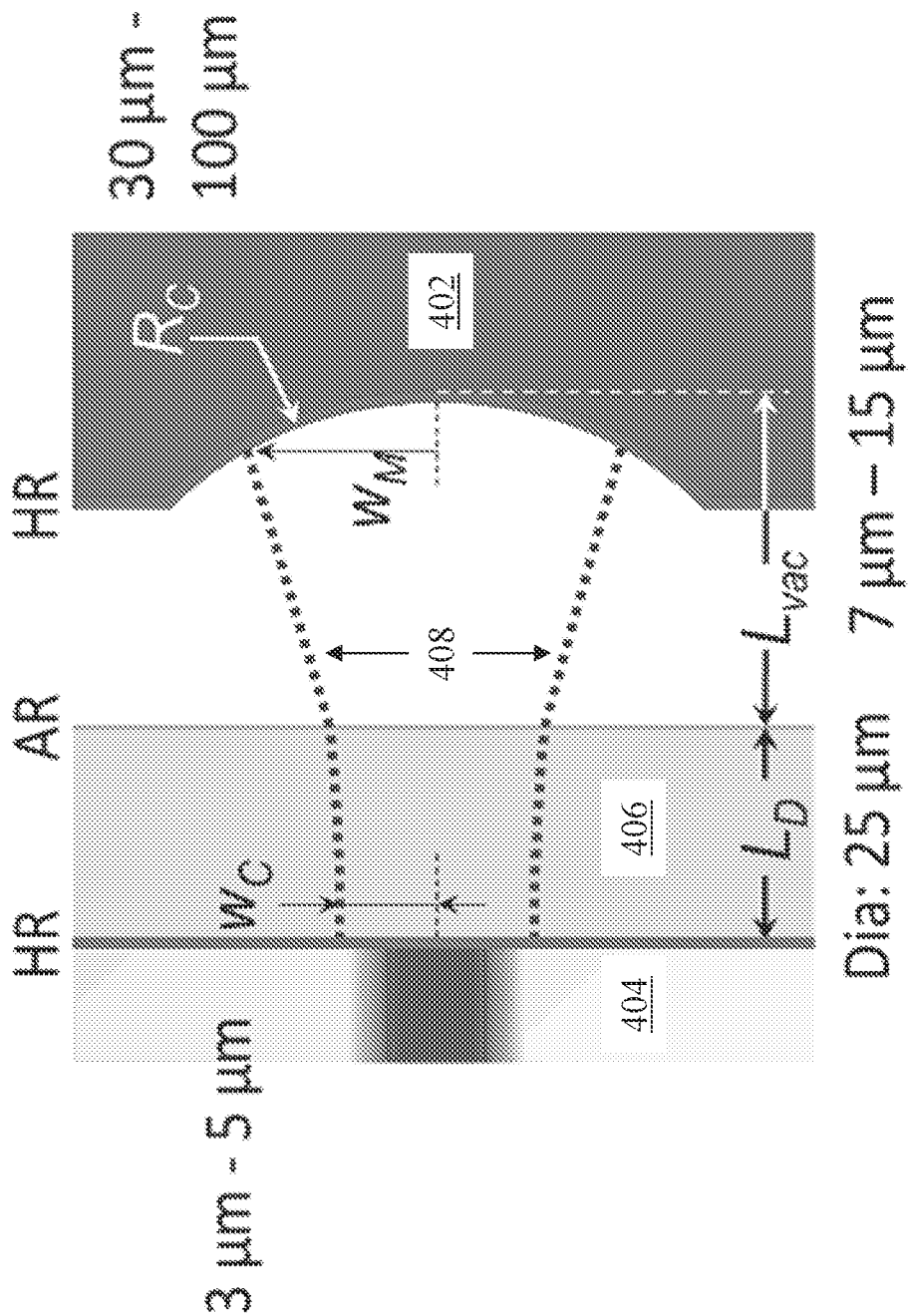
FIG. 4 is a diagram of an optical cavity system used to couple NV-defects.

FIG. 4 is a diagram of an optical cavity system used to couple NV-defects. A silicon substrate 402 is curved and polished to produce an ultra-high reflectivity mirror. This curved mirror is parameterised by its radius of curvature, R, and depth beneath the surface of the silicon. The optic fiber 404, coated with a dielectric coating 406 that on one side is polished to be highly reflective (HR) and anti-reflective (AR) on the other. The thickness of this dielectric coating is approximately $L_D$=25 micrometers. The bottom of the silicon mirror is between 7 and 15 micrometers from the AR side of the dielectric coating. The length of the cavity $L_D+L_{VAC}$=L determines the exact resonance frequency of the cavity. The optical field mode created from this cavity system can be characterized by the side of the field at the fiber side ($w_C$) and the mirror side ($w_M$), where a pulse 408 emanating from the optic fiber broadens due to dispersion and then is reflected back to the fiber by the mirror. The two HR coatings ensure the setup of a standing wave pattern between the mirrors and, with high-quality mirrors, enhance the interaction between the NV-defect if placed at an anti-node of the electromagnetic field within the cavity.

Given that the optical cavity is designed to enhance the interaction between an NV-defect and the optical field, there must be a certain level of tunability to ensure that the resonance frequency of the cavity and the resonance frequency of the NV-defect match. Tuning the resonance properties of the NV-defects would be technologically challenging for a large-scale machine containing thousands of qubits, so tunability of the cavity system is therefore necessary.

Figure 5:
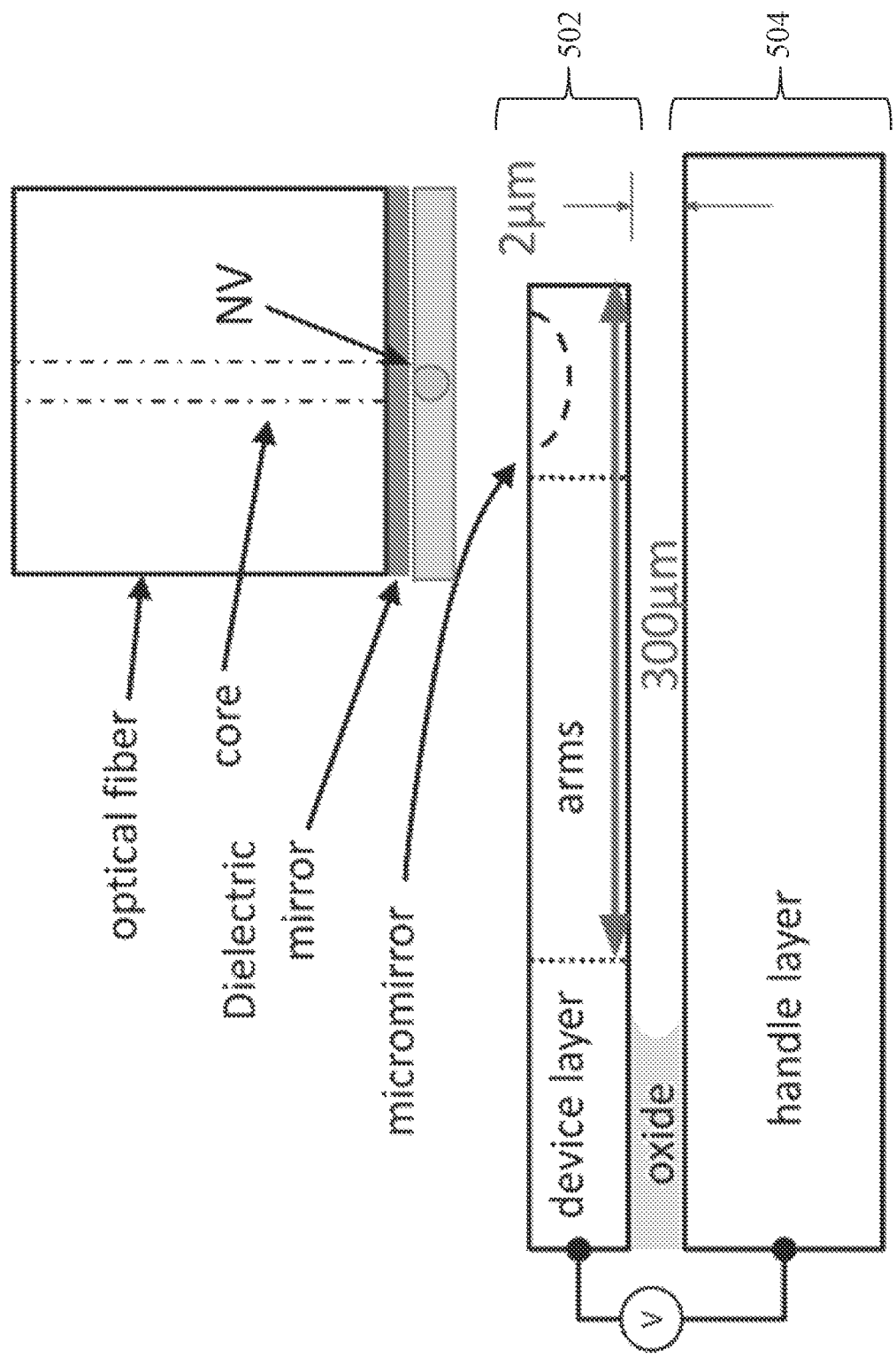
FIG. 5 is a diagram of a cantilever mechanism used to tune resonance frequency of the optical cavity system.

FIG. 5 is a diagram of a cantilever mechanism used to tune resonance frequency of the optical cavity system. As noted for FIG. 4, the resonance frequency is related to the length between the two HR coatings, $L=L_D+L_{VAC}$. As shown in FIG. 5, the curved mirror part of the cavity system is therefore placed on a cantilever system that can be positioned using fixed voltages across the cantilever 502 and a handle layer 504.

Each cantilever 502 has a length of 300 micrometers and a 2 micrometer separation between the device layer and the handle layer, allowing for up to a 667 nanometer deflection of the cantilever (although this can be increased by increasing the oxide separation between the device and handle layer). The device is fabricated and characterized as to the deflection of the cantilever as a function of the voltage applied between the handle and device layer, illustrated in FIG. 6.

Figure 6:
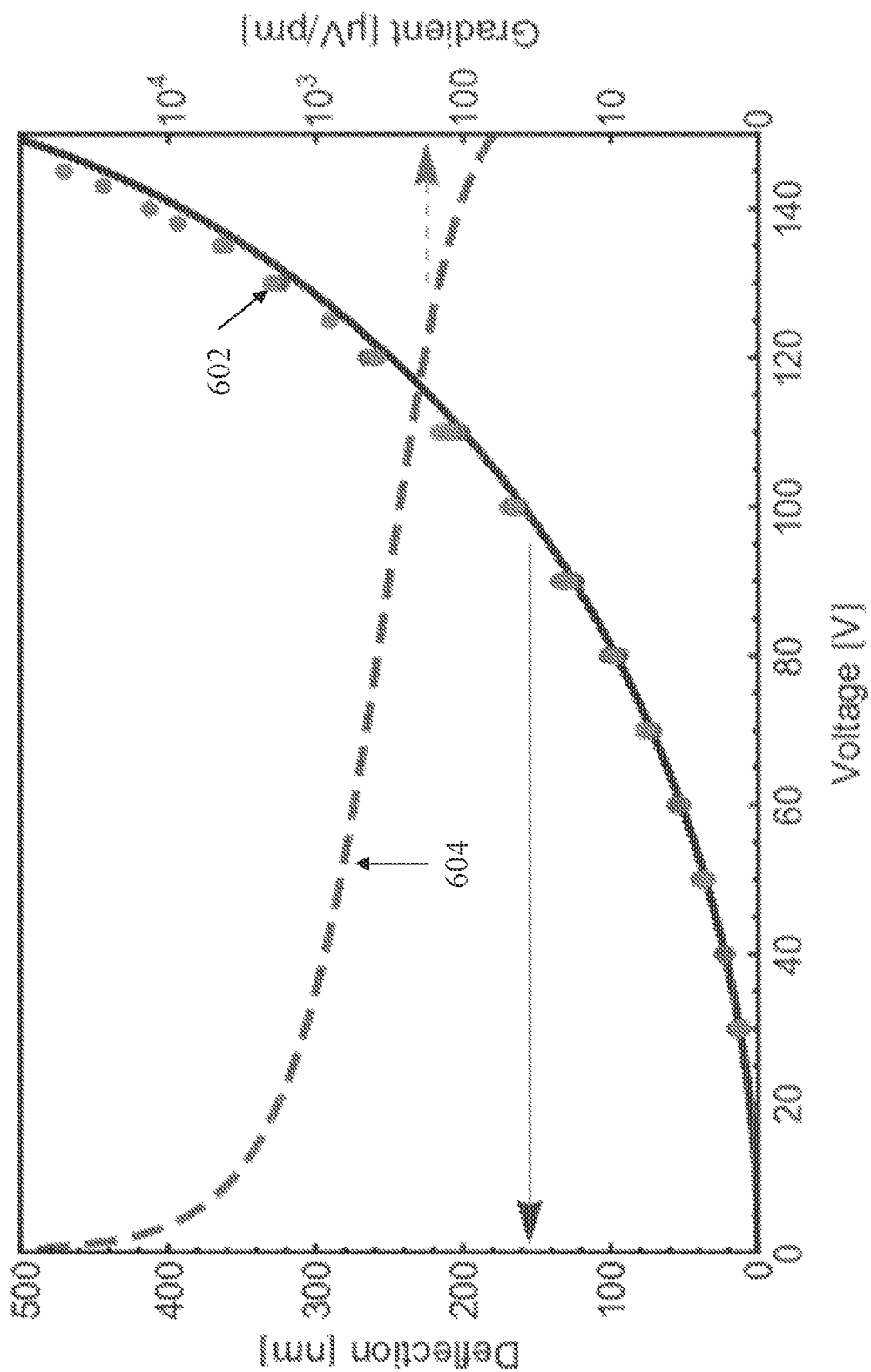
FIG. 6 is a diagram of simulated and experimental data for cantilever deflection as a function of voltage for twelve optical devices.
Figure 7:
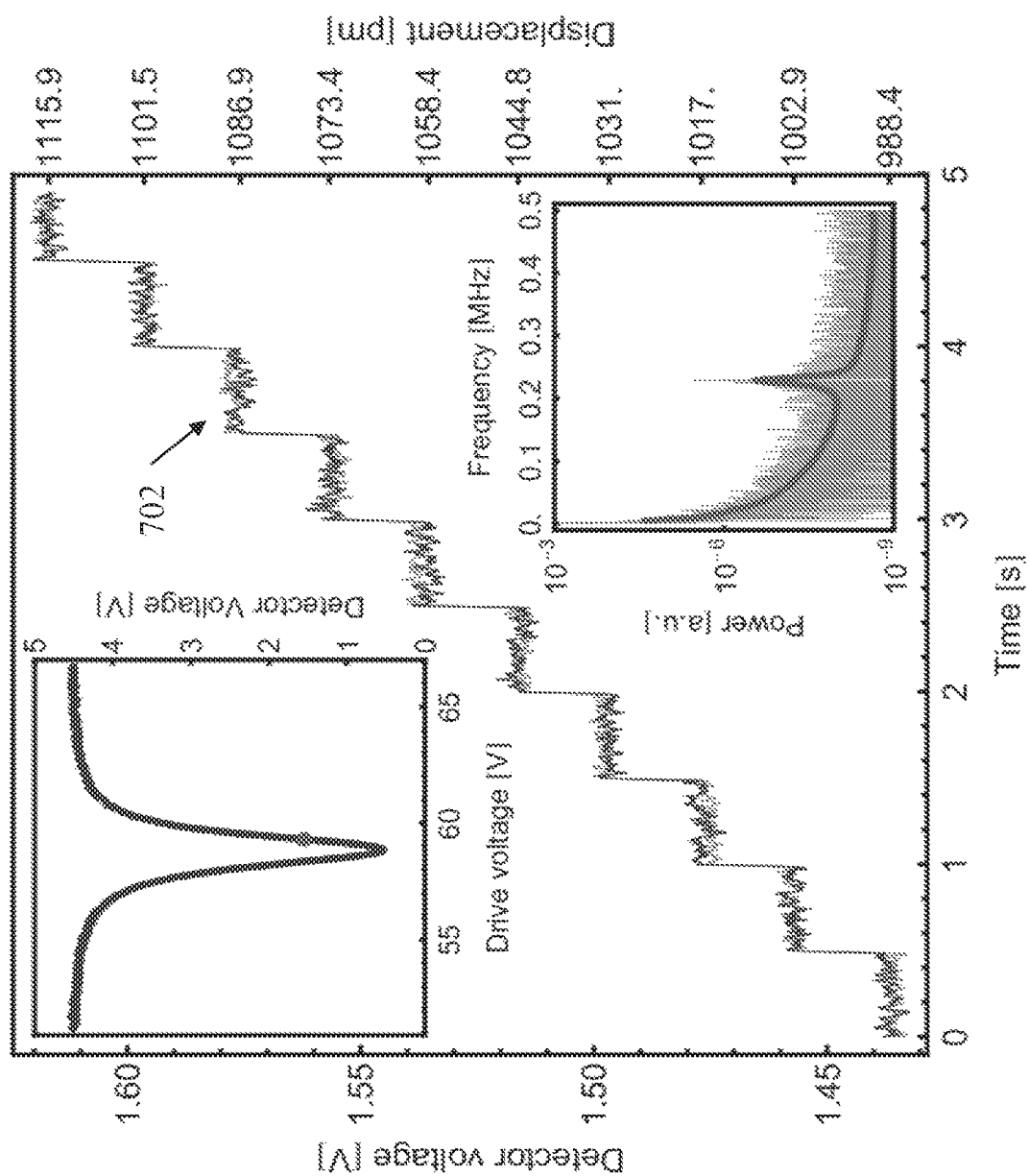
FIG. 7 is a diagram showing how the optical device can be stepped and locked with very little noise in cantilever position.

FIG. 6 is a diagram of simulated data (solid line) and experimental data (dots) for cantilever deflection as a function of voltage for twelve optical devices (i.e. each set was repeated for twelve separate, fabricated cantilevers on the same chip, the twelve dots (e.g., dot 602) at each voltage point are nearly indistinguishable as they lie almost on top of each other, indicating a high degree of repeatability in the fabrication process). The dotted line 604 illustrates the voltage gradient. The gradient profile illustrates that cantilever positioning can be resolved to the picometer level with voltage changes of the order of 100 microvolts. FIG. 7 is a diagram showing how the device can be stepped and locked with steps on the order of 10 picometers with very little noise in cantilever position (main curves 702).

Figure 8:
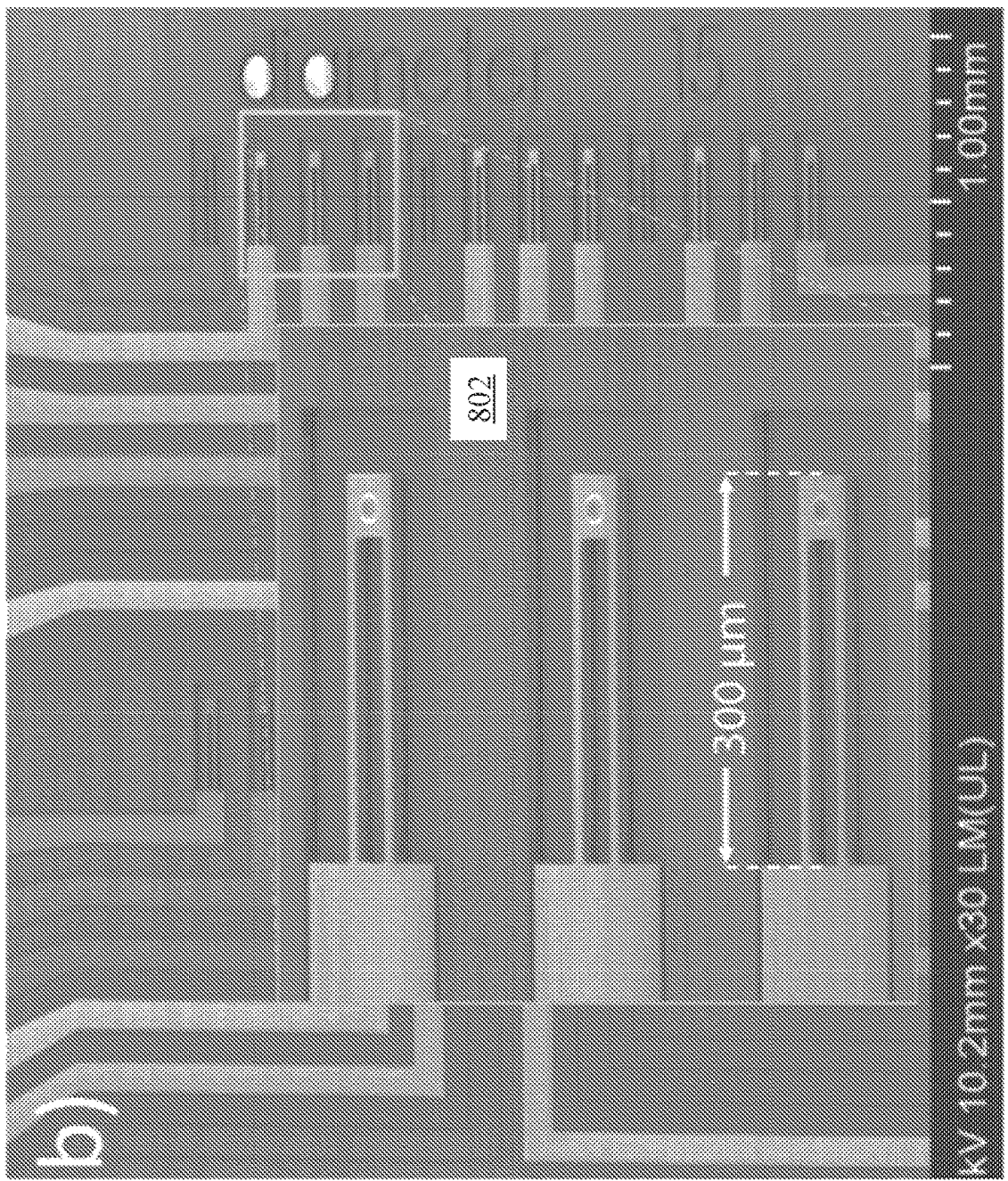
FIG. 8 is a diagram of an array of cantilever mechanisms.

The fabrication process for the cantilever system allows for the fabrication of large arrays of independently controlled mirrors. FIG. 8 is a diagram of an array of cantilever mechanisms. FIG. 8 depicts a Scanning Electron Microscope (SEM) image of a 48 cantilever array (12×4) with a zoomed-in section 802 of three of the cantilevers. The fabricated array matches the layout of the schematic in FIG. 5 as described above. The fabrication process begins with standard silicon-on-insulator wafers. These wafers are trilayer, with the device layer of 50 micrometers, a buried oxide layer of 2 micrometers and then a 400 micrometer handle layer.

Mirrors are then fabricated onto the upper layer using a standard inductively coupled plasma etching process, where first a masked etch takes place for seventy seconds and then a maskless etch of seven minutes takes place. The entire device is then coated with a 10 nanometer bi-layer of titanium and gold using electron beam evaporation. Using a standard Bosch cycle, the device layer is then structured down to the oxide layer with 100 cycles, lasting 500 seconds each. This process defines the cantilevers themselves and the conduction tracks that connect each cantilever to bond pads located at the edge of the chip. These conduction tracks and bond pads allow for the voltage to be applied to each cantilever independently to set and lock its respective position. The buried oxide under each cantilever is then dissolved away in hydrofluoric acid for 15 minutes. Cavity mirrors are then further polished to reduce surface roughness (at this stage of development<0.3 nanometers) and increase the reflectivity properties of the cavity mirror.

In one embodiment, the device comprises a 12×4 array of cantilevers, separated by 250 micrometers vertically and 1.75 millimeters horizontally. The extra spacing of the horizontal separation between rows allows for sufficient space for the conduction tracks to be etched to the edge of the chip. Further development of the production process has allowed for more dense arrays with both vertical and horizontal separations reduced.

The cavity systems described herein have been extensively examined to both test the quality of the optical cavity produced and the ability to couple together the cavity modes of independent cantilever systems. Tuning the cavity resonance using the positional shifting and locking of the cantilever system has been demonstrated allowing for the cavity resonance to be shifted over a wide range of optical wavelengths, appropriate for variation in the NV-defect that needs to be coupled to the cavity.

Cavity finesse has been tested at a wavelength of 1.55 micrometers to be over 140,000 and the cavity quality factor has been demonstrated to be approximately 10 million. The cooperativity of the cavity system currently fabricated is greater than 10. These parameters are well within range for devices that would be integrated into a large-scale diamond based qubit array, with further refinement leading to lower error rates for qubit operation. Mass fabrication of cavity arrays can be achieved using the same techniques that were used for initial prototyping.

The cavity arrays themselves are fabricated according to the results from the implantation level of NV-diamond qubit chip production. As set forth in FIG. 1 above, after implantation a functional array of NV-defects at known locations is the end point of the NV fabrication process. This process dictates the positioning for the masking and etching procedure for the silicon cavity array. Cavity systems are only etched onto the silicon chip if a functional NV-defect is available for a given position. This ensures that resources are not wasted in terms of conduction tracks, bond pads and polished cavities for NV-defects that are not functional.

Integrated Optics Interface

The optical interface is the system that allows for us to connect together the optical cavity modes of physically separated NV-cantilever systems. The simplest connection is a simple optic fiber that is connected to two cavity independent cavity systems without any further control. This is limited because for a functional, large-scale machine, it may be required to switch connections between a given NV-cantilever system and multiple neighbors.

The fabrication of the cavity system is dictated by the location of functional NV-defects in the diamond chip. However, the diamond chip is not directly connected to the silicon cantilever system. As illustrated in FIG. 5, the diamond wafer is attached on the fiber optic side of the cavity system just in front of the dielectric coating that acts as one half of the cavity. The optic fiber connections are illustrated in FIG. 9.

Figure 9:
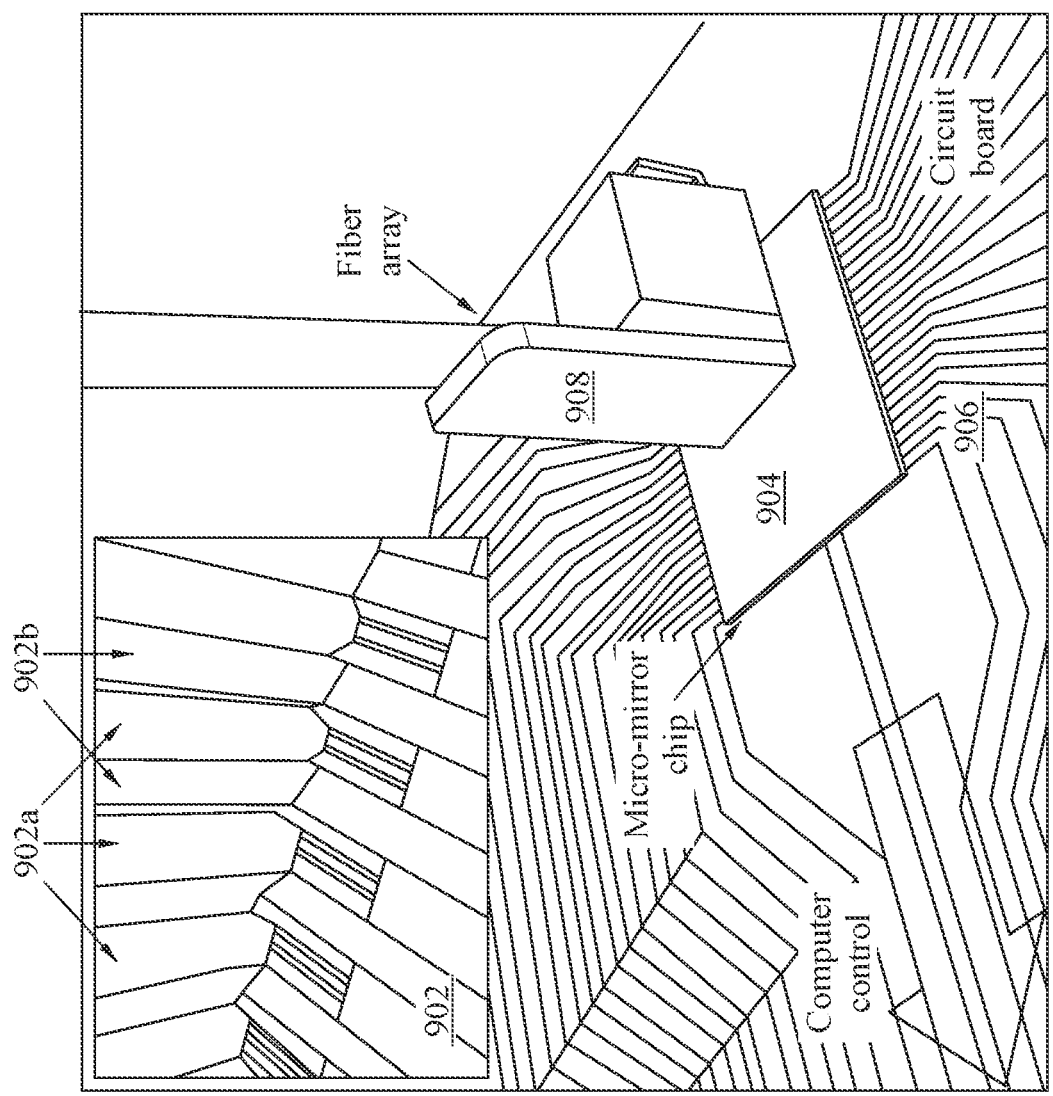
FIG. 9 is a diagram of an optical fiber interface for connecting optical cavities of physically-separated NV-cantilever systems.

FIG. 9 is a diagram of an optical fiber interface for connecting optical cavities of physically-separated NV-cantilever systems. The inset diagram 902 of FIG. 9 is the mounting and alignment scheme for an array of fiber optic cables. The structure is an etched silicon chip containing V-grooves (e.g., 902a, dark gray) that are aligned with each micro-mirror cavity fabricated on each cantilever in the silicon chip. The v-grooves are used to align each optic fiber (e.g., 902b, light gray) with the cantilever mirrors and ensure that the optical mode for each single-mode fiber couples directly to the cavity at each location of the chip. This device is then mounted on top of the silicon micro-mirror cantilever array as illustrated in the main part of FIG. 9. The actual silicon micro-mirror chip is the object 904 in the center of the image, with each conduction track for cantilever control and calibration coming off onto an external circuit board 906. The silicon fiber optic mounting chip 908 sits vertically on top of the micro-mirror chip and optic fibers come out vertically from the mounting chip to various lasers and spectral analyzers.

Figure 10:
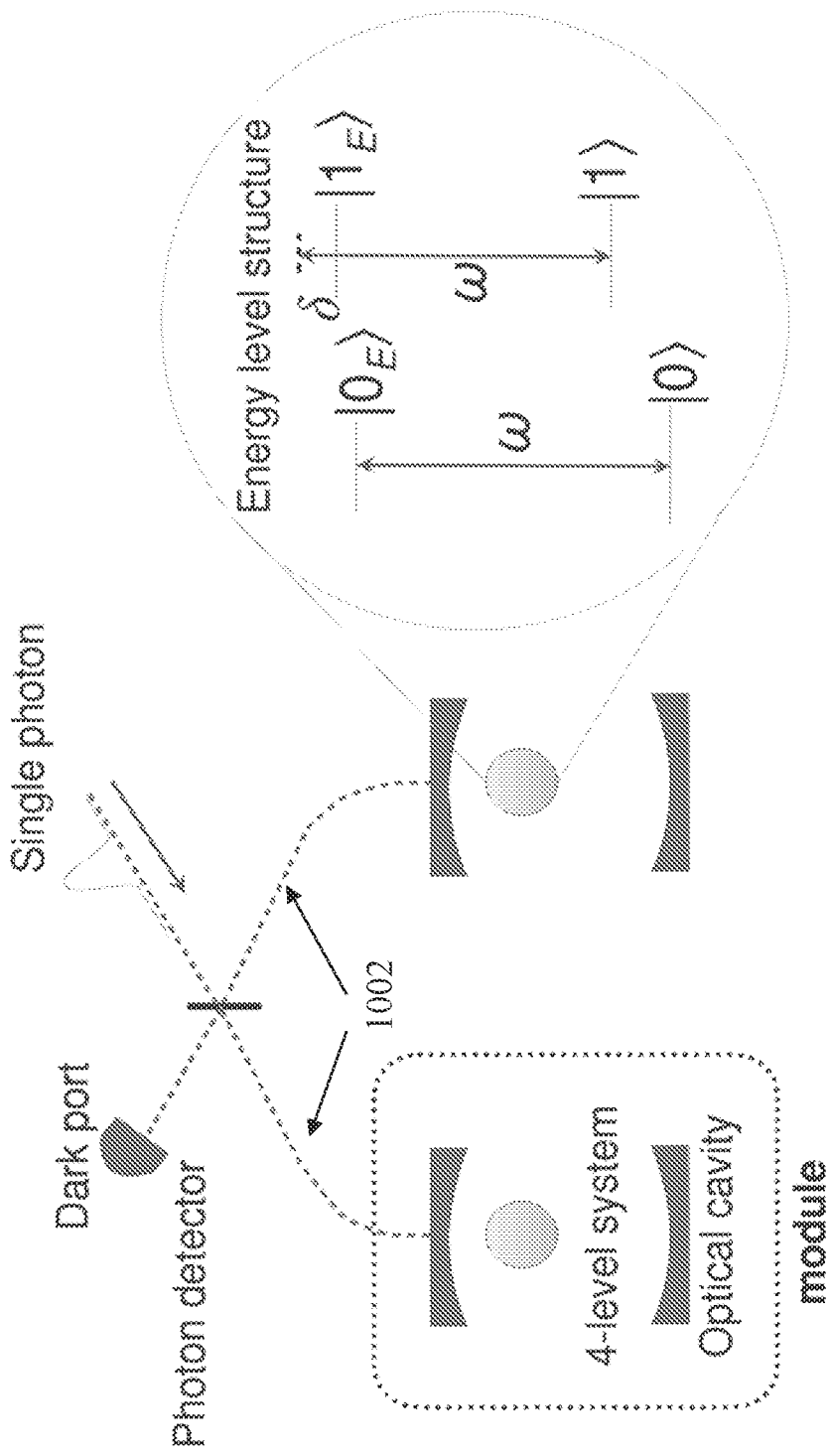
FIG. 10 is a diagram of an optical set-up for coupling physically-separated NV-defects together.

As detailed in more depth later in this document, the procedure needed to couple together two, physically separated NV-defects requires an optical setup as shown in FIG. 10. Each "module" in this diagram is a single NV-defect contained within its respective cantilever system. The fiber optic connection is illustrated with the dotted lines 1002; two fiber lines need to "mix" on a 50:50 beam-splitter and the outputs of the beam-splitter are two optic lines which go to a single photon (or weak coherent) source and a photon detector (avalanche photon detector, superconducting detector or other technology is sufficient provided it can differentiate between a single photon and the vacuum).

This optical set-up allows for the coupling of two, spatially separated NV-defect systems, but is restricted to only two. A large-scale quantum computer typically requires more flexibility when connecting a given NV-defect system to a finite subset of neighboring systems.

Integrated optics is now a mature technology, with the ability to transfer optic fiber, beam-splitters, waveplates and even single photon sources and detectors to integrated, etched silicon circuits that can be mass-manufactured and purchased in bulk. Like with optic fiber, the ability to confine and guide optical wave-packets requires setting up a refractive index differential, i.e. a "core" and a "cladding" with sufficiently different indices of refraction to suitably confine an optical wave-packet over long distances. By careful choice of core and cladding material, integrated optics can be fabricated to support only single transverse optical modes for a pre-specified wavelength ranges (including the wavelengths necessary for coupling together two NV-defect systems). This is now done routinely and integrated optical chips can be bought as essentially made-to-order devices, fabricated for a given optical circuit layout and configured for optical wavelengths that can be supported by the fabrication process.

The specific details of the integrated optics part of the present system architecture described herein are ultimately dictated by the specific connection geometry that is required for the qubit array. Namely, a given NV-defect can, in principle, be connected to every other NV-defect in the array. However, this is not only undesirable for engineering reasons, but ultimately not needed for a functional quantum computer. Instead a given NV-defect only needs to talk to a comparatively small and finite number of other defects in the system. Example structures of the integrated optics layer can be considered for several different operating conditions for the present architecture. Each of these can be detailed individually and then combined into a programmable integrated optics chip that allows the system to switch between different "operational modes" of the architecture using purely an initial configuration or quantum bios set-up.

For a given pair of NV-defects, the following components are required to perform coupling between the spatially separated defects:

Four connected optical lines. Two of these optical lines are the fiber optics connected directly to the cavity arrays associated with the NV-defects that need to be connected. The other two optical lines are connected to a single photon or weak laser beam source and a single photon detector.

These four optical lines must be separated by a 50:50 optical beam-splitter. Of the four ports of a 50:50 beam-splitter, two on one side are connected to the cavity systems while the other two are connected to the source and detector respectively (see FIG. 10).

The 50:50 beam-splitter must be a switchable element. Namely, it must be possible to effectively "turn off" and "turn on" the beam-splitter when required by applying some external control field. The beam-splitter must be "turned on" when attempting to couple together two NV-defects, but "turned off" when utilizing the fiber optics to measure or "read out" the quantum state of individual NV defects.

Universal Non-Error Corrected Geometry

Figures 11A, 11B:
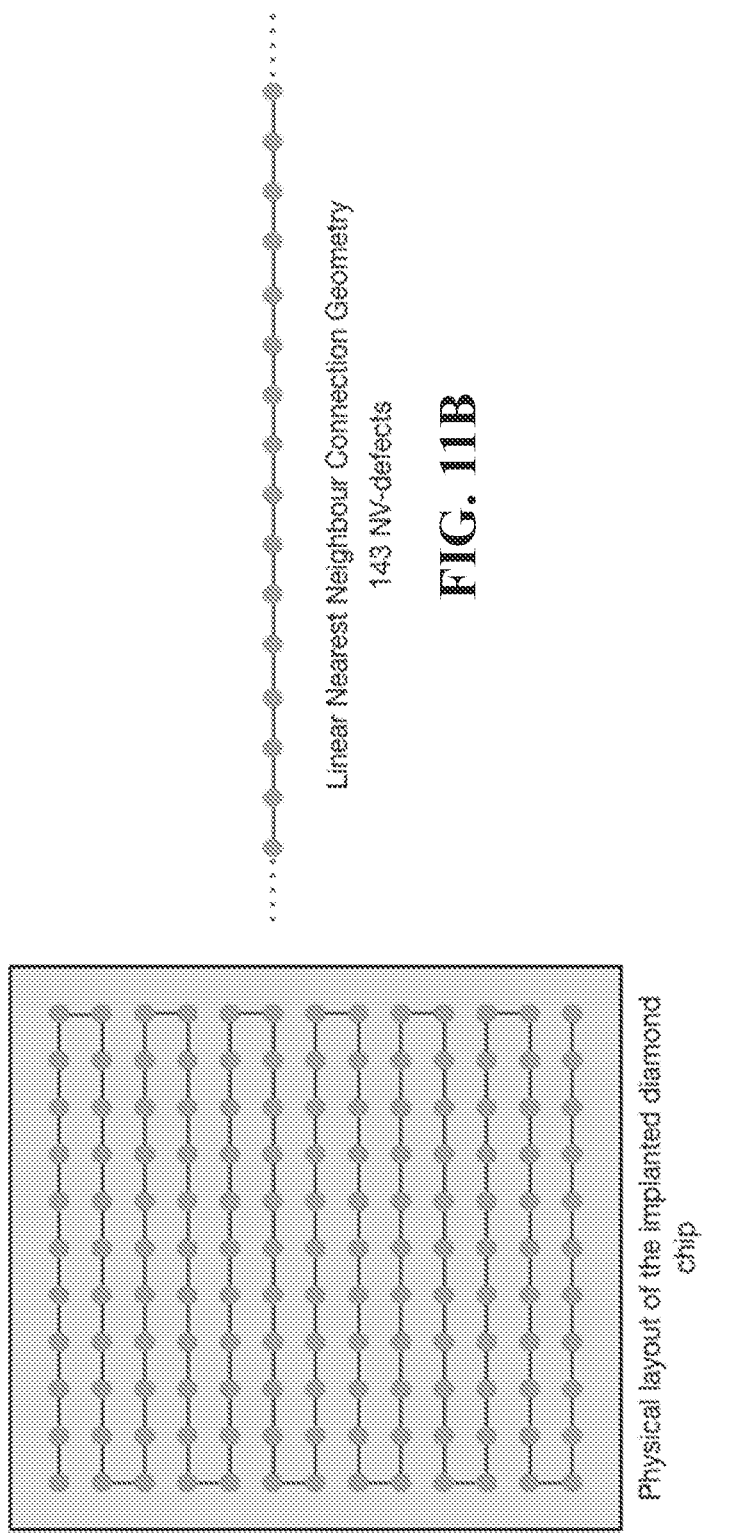
FIG. 11A is a diagram of the physical layout of NV-defects.
FIG. 11B is a diagram of abstract connection geometry for NV-defects.

The minimal level of connectivity of the system needed for universal computation is known as a Linear Nearest Neighbor (LNN) connection geometry. This is where the qubit array is considered (in the abstract) as a linear chain of NV-defects with the ability to connect a given defect to its immediate neighbor to the left and right. The physical geometry of the cantilever cavity system is two-dimensional, but the connection geometry is dictated by the structure of the integrated optics connected to the cavity array. FIG. 11A is a diagram of the physical layout of NV-defects. FIG. 11B is a diagram of abstract connection geometry for NV-defects.

As shown in FIG. 11A, the physical layout of the implanted diamond chip assumes that every implanted site contains an appropriately active single NV-defect. As discussed earlier, this is not the case with a real fabricated chip, and this will be discussed further below.

The integrated optics requires the four port beam-splitter arrangement to be configurable between each neighboring pairs of defects. Pair-wise coupling can only take place between two isolated NV-defects at any one time (i.e. a given defect cannot be involved in two coupling operations at the same time). Consequently, the integrated optics needs to be configurable such that pairs {1,2}, {3,4}, {5,6}, . . . can be coupled in each even time-step and pairs {2,3}, {4,5}, {6,7}, . . . in each odd time-step (although the details of the quantum circuit that is run on this system enforces the constraint that a given NV-defect is only involved in one coupling operation at any given point in time).

This LNN geometric connection geometry is sufficient to run universal quantum algorithms, but is it not appropriate to run efficient error-correction protocols that may be needed later as the architecture expands. There is a current drive within the community in an area which has recently been coined Noisy Intermediate-Scale Quantum (NISQ) technology. NISQ refers to applications that could conceivably be run without the need for resource intensive error-correction protocols. Unfortunately at this stage, there have been no viable applications identified that are small enough (in terms of quantum circuits) to neglect error-correction and it is unlikely in the near term that qubits will be fabricated with error rates low enough to run larger, more commercially viable, algorithms without error correction.

However, the ability to configure the architecture described herein to run in a non-error corrected or NISQ mode may be useful if such applications are identified, or simply to run proof-of-principle or calibration protocols such as randomized benchmarking and/or quantum supremacy. Supremacy protocols would represent an important demonstration protocol to be run on the machine to confirm quantum behavior and that the present architecture is running as advertised. A software configurable NISQ mode is therefore desirable.

Figure 12:
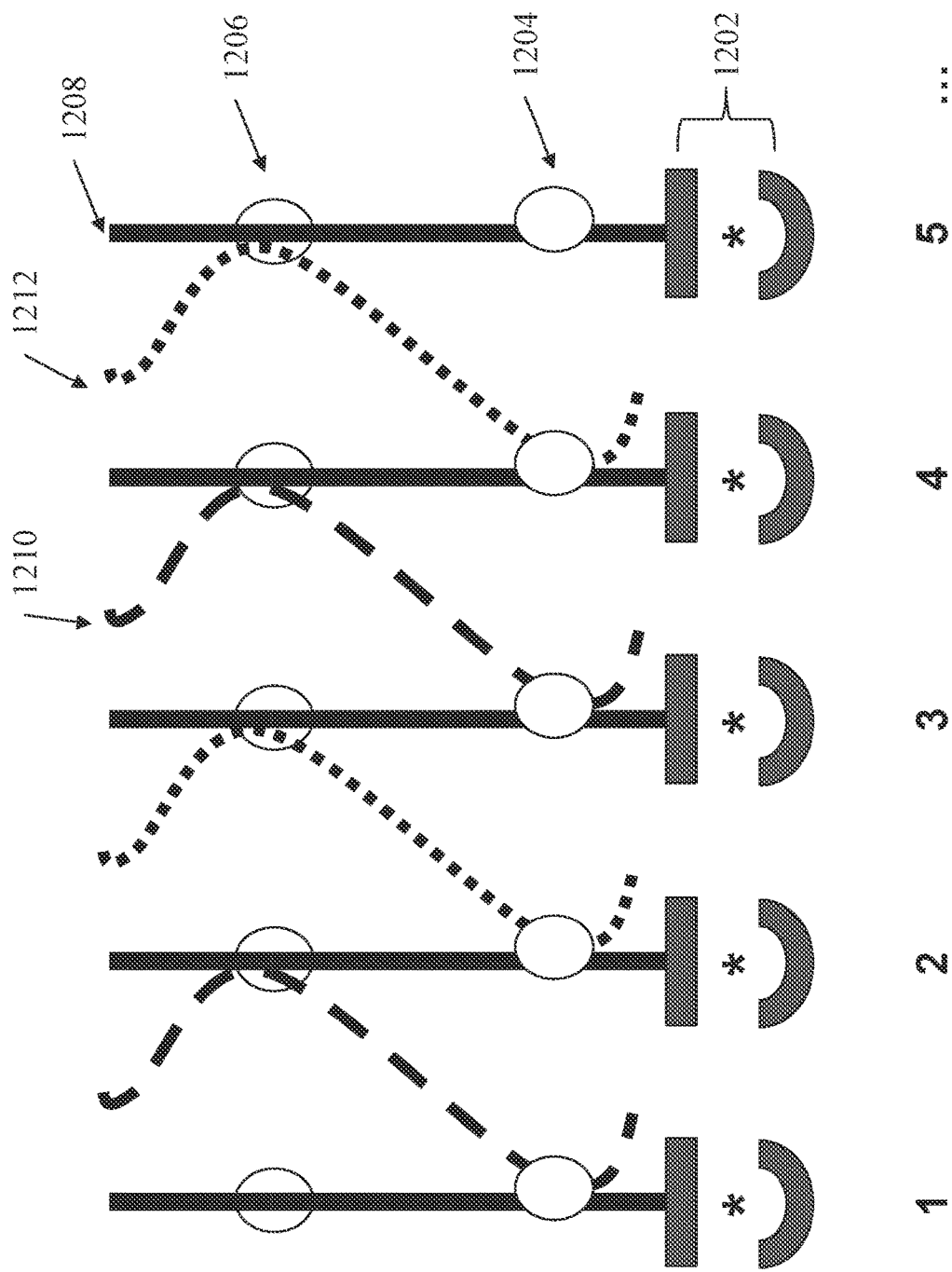
FIG. 12 is a diagram of an integrated optics structure for a linear nearest neighbor (LNN) connection geometry.
Figure 13:
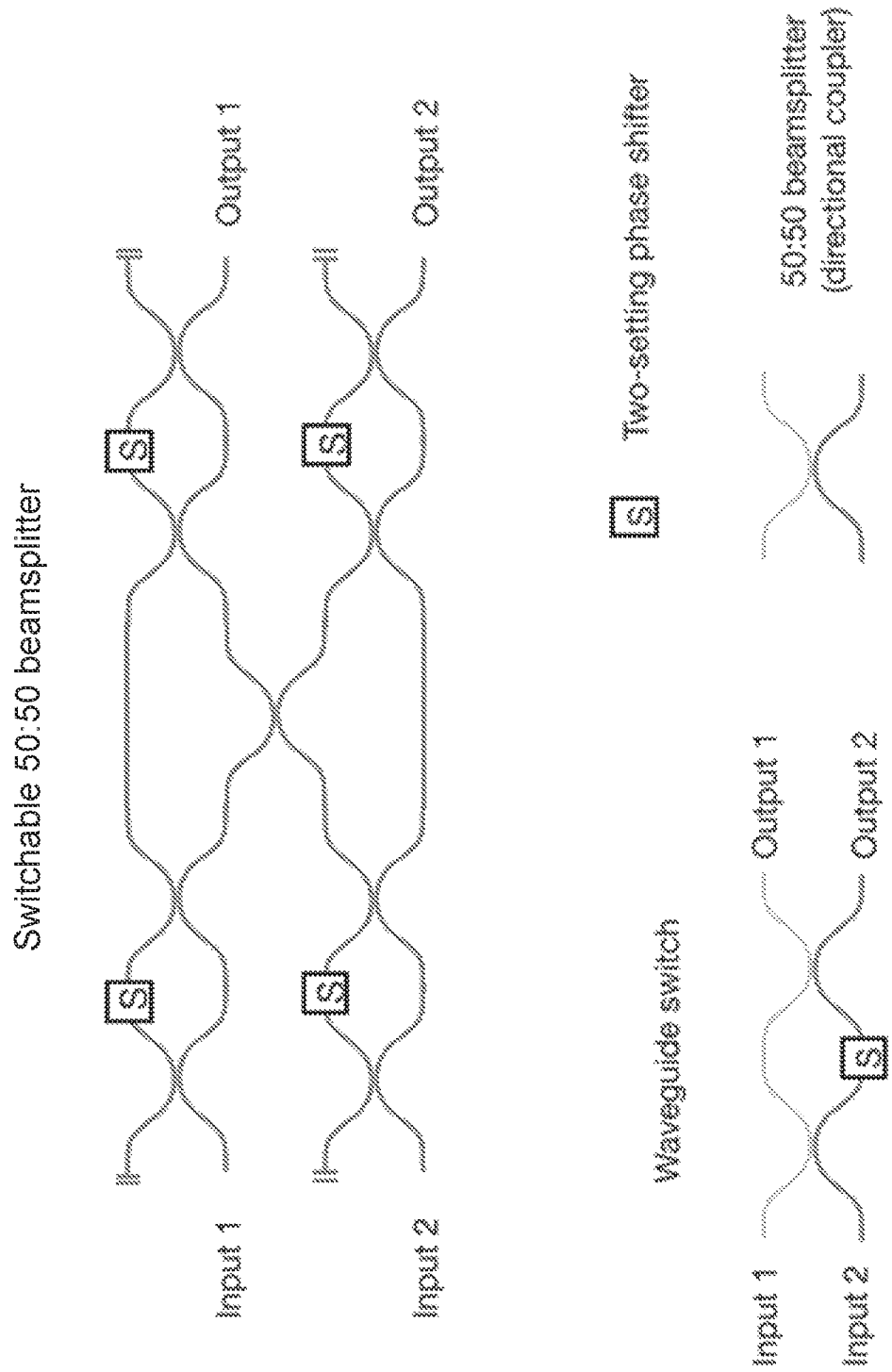
FIG. 13 is a diagram of controllable optical switches and a switchable beam splitter of the integrated optics structure.

FIG. 12 is a diagram of an integrated optics structure for a linear nearest neighbor (LNN) connection geometry. There are several components to this structure. FIG. 12 assumes that all cavity systems contain a single, active NV-defect and hence will be part of the final qubit array in the architecture. This is indicated by the stars (NV-defects) 1202 within the black cavity system. The solid lines (e.g., 1208), dashed lines (e.g., 1210), and dotted lines (e.g., 1212) represent optical waveguides within a silicon integrated chip. There are three types of lines, reflecting their use when coupling NV-defects together. Additionally, FIG. 12 includes two types of circle elements that represent controllable optical switches (solid circle, e.g., 1204) and a switchable beam splitter (translucent circle, e.g., 1206). The structure of these elements are illustrated in FIG. 13.

Turning back to FIG. 12, the translucent circle (e.g., 1206) is designed to be switched in one of two modes: either a 50:50 beam-splitter or nothing. The solid circles (e.g., 1204) are switchable elements that either do nothing or swap two optical modes (i.e. an optical switch). As noted earlier, in alternating timesteps coupling of cavity/NV systems, {1,2}, {3,4}, {5,6} . . . then {2,3}, {4,5}, {6,7} . . . is needed. This is the set of dashed line waveguides (e.g., 1210) and dotted line waveguides (e.g., 1212), respectively. When coupling operations are being performed, all translucent switches (e.g., 1206) are set to "beam-splitter" mode. Assuming an even time-step when sets {1,2} . . . are coupled, a single photon or weak coherent optical pulse is sent into the 50% of solid line waveguides (e.g., 1208) that connect with the dashed line waveguides (e.g., 1210) at the translucent switch (e.g., 1206). The solid switches (e.g., 1204) are all set to "swap" mode. The single photon/weak coherent mode is split on the translucent beam-splitter 1206 and each half of the optical wave-functions from each source are sent to the pairs {1,2}, {3,4}, etc. A reflected signal travels back through the network and single photon detectors are placed on the output of all dashed line waveguides (e.g., 1210). The detection of a single photon or weak coherent pulse at this output confirms coupling between the pairs of NV-defects {1,2}, {3,4}, etc. The mechanism of this is discussed later in this document.

All coupling operations for the pair sets {1,2}, {3,4} . . . occur simultaneously as they do not overlap in either the optical network or the NV cavity system. Once these coupling operations are completed, the same single photon/ weak coherent pulse is now sent into the 50% of solid line waveguides that connect with dotted line waveguides (e.g., 1212) at the translucent switches (e.g., 1206). This allows the coupling of the pairs {2,3}, {4,5}, etc. in exactly the same manner as the first pairwise sets. Again, these connections can be performed in parallel across the entire array. After these two sets of operations are completed, the system has connected the entire linear chain across the NV-array as detailed in FIGS. 11A & 11B.

In practice, coupling of every pair of NV-defects simultaneously at even and odd timesteps may not be required. The quantum circuit run on this system dictates which pairs of neighboring NV-defects will need to be coupled at any given time. However, this optical arrangement allows for pairwise coupling using the optical mechanism in FIG. 10.

Above, it was noted that both the translucent circles 1206 and solid circles 1204 in FIG. 12 need to be a switchable element. This is not required for the coupling operation between NV-defects. Instead, these elements are switchable because optical readout is used to measure individual NV-defects during computational operations. When a qubit is measured, direct optical access is required. Each solid line waveguide (e.g., 1208) provides this access—provided that both translucent circles 1206 and solid circles 1204 in FIG. 12 are switched to the "off" mode (i.e. not acting as a beam-splitter and switch, respectively). Individual measurements of qubits are interspersed between coupling operations. When this occurs, the beam-splitter and switch associated with the qubit to be measured are placed in the "off" mode and a single photon/weak coherent pulse is sent directly down the solid line waveguide of the NV-defect to be measured. A reflected pulse that is detected on the solid line waveguide indicates a certain measurement result on the NV-defect (details are given later in this document).

Figure 14:
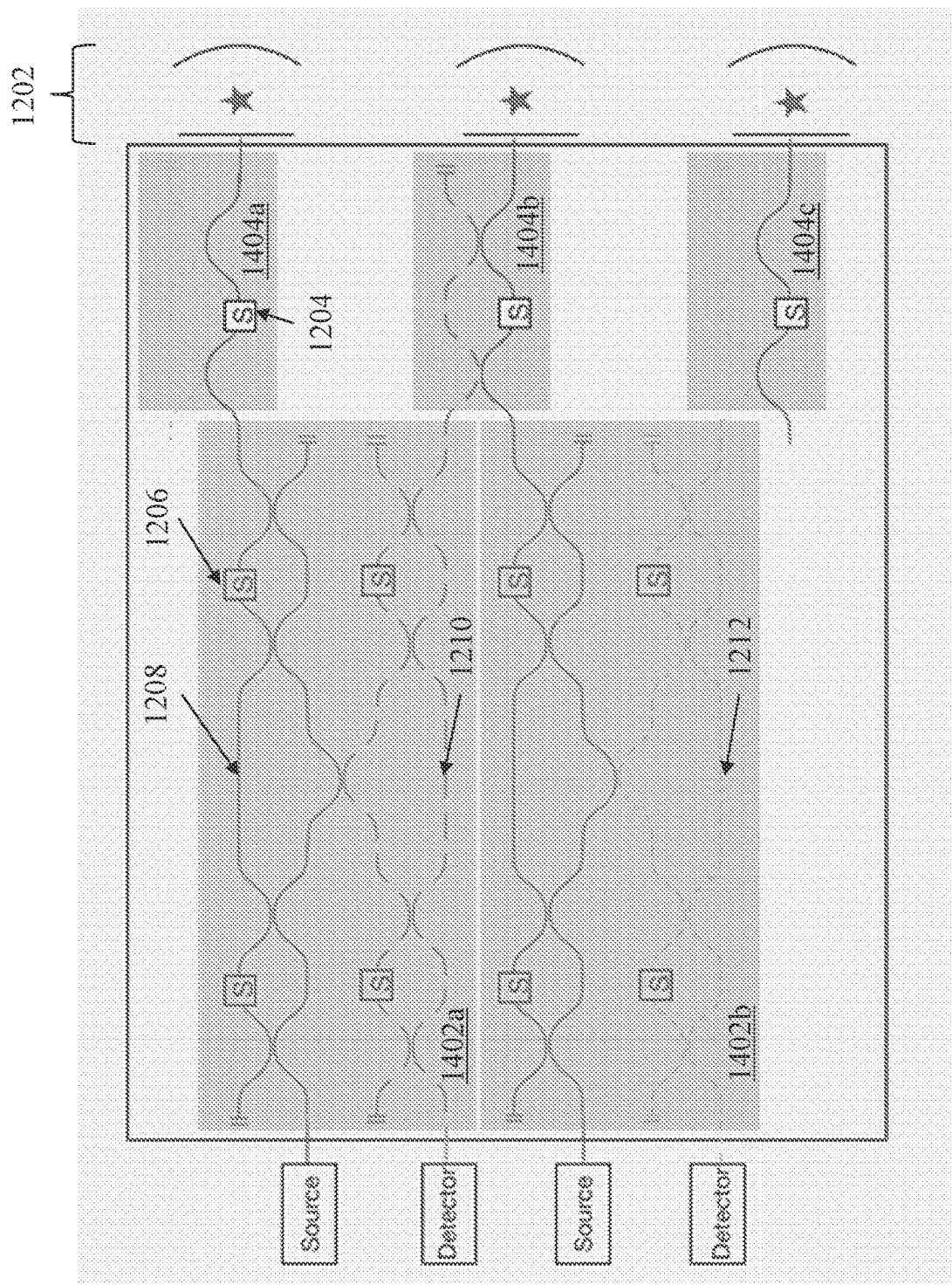
FIG. 14 is a diagram of the integrated optics structure with an optical switch set to 'on.'

The coupling procedure uses an optical source on each of the solid line waveguides (e.g., 1208) and detectors on either the dashed line waveguides (e.g., 1210) or dotted line waveguides (e.g., 1212), depending on which set of coupling operations are being performed. Measurement on a given qubit would require routing any reflected optical pulse from the solid line waveguides to the detectors. This extra machinery can be mitigated by choice of the switching setting on the two elements. If the translucent element 1206, representing the beam-splitter, is set to "off" mode and the solid element 1204, representing a switch, is set to "on" mode, then any reflected signal from a given NV/cavity system is routed to the detector located to the immediate right of the respective solid line waveguide 1208 connected source, as illustrated in FIG. 14. This configuration allows any reflected measurement signal to be naturally routed to a detector without any further optical technology or devices.

The integrated optics structure of FIG. 14 can be currently fabricated commercially to made-to-order specifications at extremely high fidelity. Each curved pair of waveguides is known as a directional coupler, which acts as a 50:50 beam-splitter in an integrated optics environment. The switchable beam-splitter is illustrated in the boxes 1402a, 1402b. This is made up of four Mach-Zehnder interferometers, each with a controllable phase shifter (S) which operates as a controllable switch. This phase shifter can, for example, be a heating element sitting on top of the waveguide that changes the refractive index of the waveguide to enact a discrete phase shift on any optical pulse flowing through it. By having two discrete settings on the phase shifter, this circuit element allows us to turn on or off the switch to route an optical pulse along two output rails. After the first switch is a second directional coupler that performs the required 50:50 beam-splitter operation followed by a second switch. This unit allows us to either "turn on" or "turn off" the beam-splitter, based on the settings of all S-boxes in the respective boxes 1402a, 1402b. The boxes 1404a, 1404b, 1404c represent a simple "on/off" switch as required in FIG. 12.

Optical sources and detector systems can also be placed on the integrated optics chip, but in FIG. 13 are shown as separate elements. Each solid line waveguide then couples into the optic fibers connected to the cavity systems of individual active NV-defects.

The structure of FIG. 14, when replicated, allows for the required LNN connections between pairwise NV-defects in the chip system. As mentioned earlier, not every implanted site will contain an active NV-defect. But this <100% yield in the fabrication of the NV-defects can be overcome by simply tagging which sites are active and by fabricating the integrated optics structure illustrated in FIG. 13 appropriately.

Figure 15:
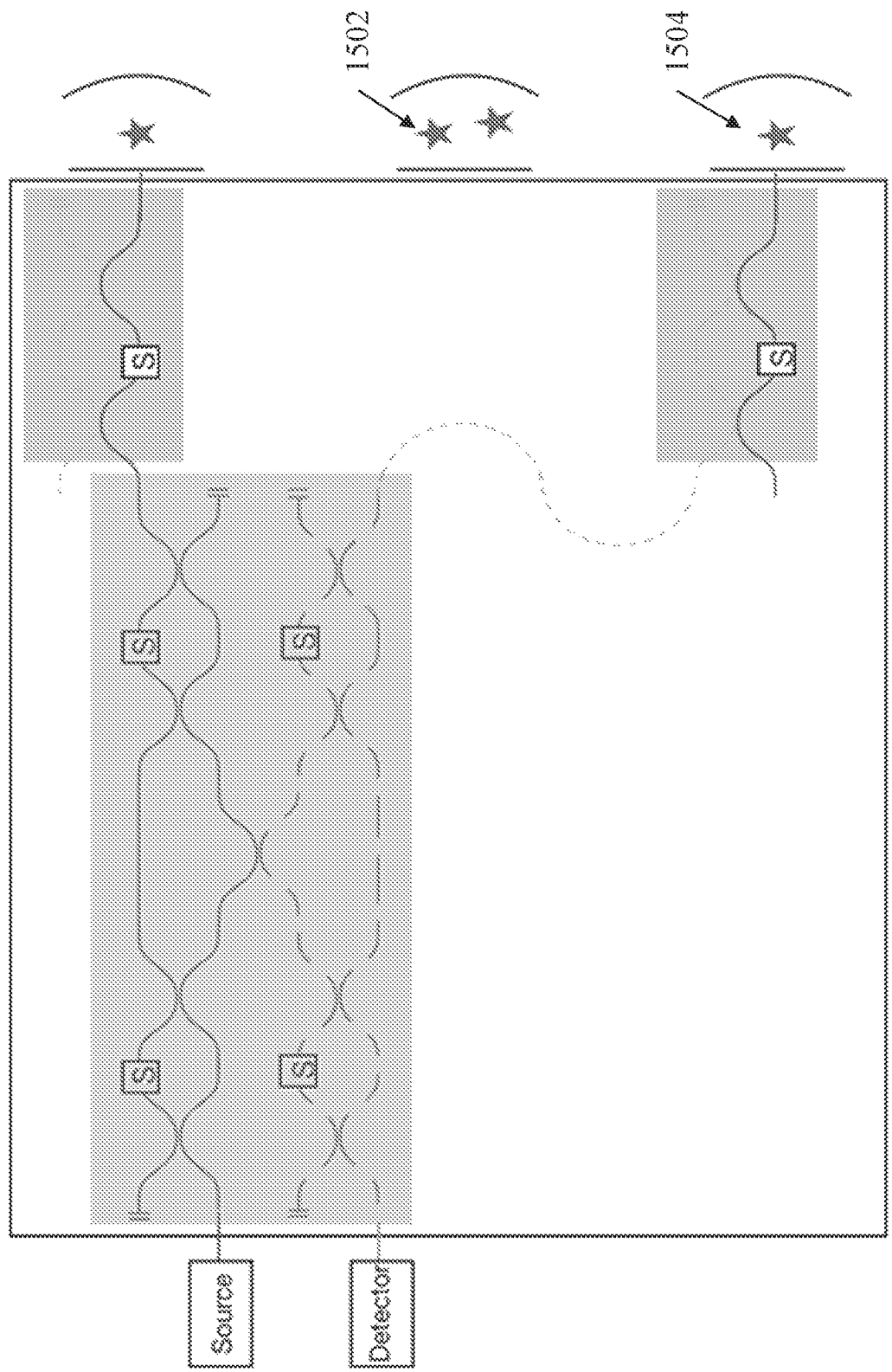
FIG. 15 is a diagram of the integrated optics structure with an optical cavity having multiple NV-defects.

FIG. 14 assumes that every cavity site contains an active NV-defect, and therefore represents the densest integrated optics structure that is needed for this LNN structure. If certain cavities contain multiple NV-defects, misaligned NV-defects or no defect at all, the structure simply requires bypassing that particular cavity site. This can be done, chip-by-chip as it is manufactured and characterized, as illustrated in FIG. 15. In this case, the middle cavity system 1502 contains two NV-defects and, hence, is "dead." One of the switchable beam-splitters from FIG. 14 is removed and the integrated optics chip is modified to route to the next active NV/cavity system (e.g., 1504). This maintains a LNN chain of connected qubits across the 2D chip, even if an arbitrary number of individual sites are classified as "dead" due to inactive, multiple or zero actual NV-defects.

Two-Dimensional Connectivity

Figure 16B:
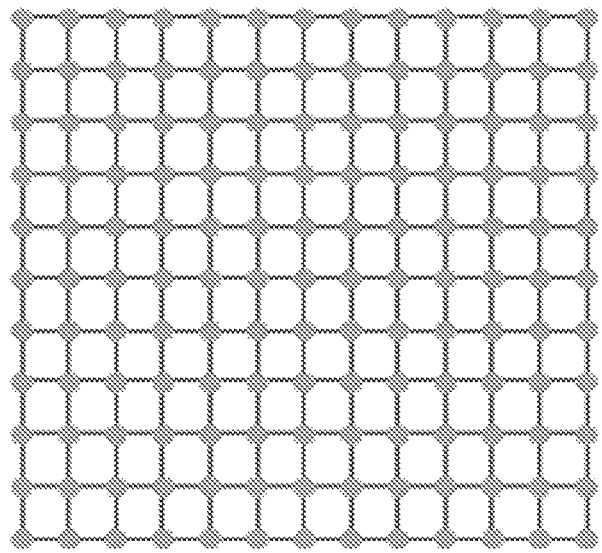
FIG. 16B is a diagram of an abstract geometric layout of NV-defects.
Figure 16A:
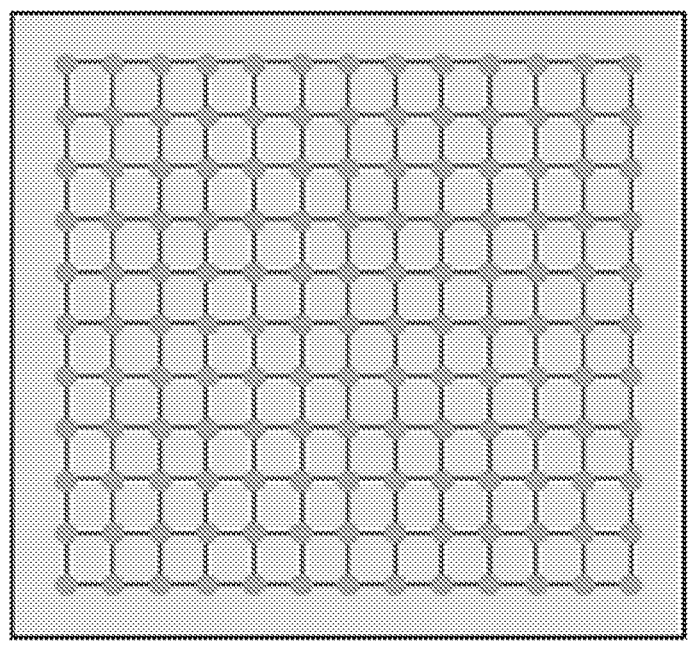
FIG. 16A is a diagram of a physical layout of NV-defects of an implanted diamond chip.

The previous section outlined the integrated optics structure necessary to connect the 2D NV/cavity chip into a LNN connection geometry for universal quantum computation. As noted earlier, this is insufficient for implementing efficient quantum error correction codes for large-scale computation. For this, an individual NV-defect is required to be connected to nearest neighbors in two-dimensions, what is known as a 2DNN (2-Dimensional Nearest Neighbor) geometric layout, as illustrated in FIGS. 16A and 16B. This requires a modification of the integrated optics structure.

Replacing the integrated optics chip with one that efficiently allows for a 2DNN structure is undesirable, as being able to reconfigure the system to accommodate both geometric connection geometries at the software control (or Quantum bios) level would be desirable. Instead, the integrated optics structure for a 2DNN geometry should imbed the connection geometry that has already been specified for LNN, non-error corrected, universal operation.

Given that the integrated optics structure of FIG. 14 already allows for NV/cavity systems to be connected to their immediate neighbors to the left and right on the 2D chip, one or more second integrated optics chips, oriented at 90 degrees to the first set of chip(s) would allow for connections to be made to neighboring NV/cavity systems above and below.

The first set of chips is designed to route optical signals down the required pathways to enable the connection of NV/cavity systems to their immediate left/right (east/west) neighbors in the 2D NV-array in the same manner as discussed for the LNN connection structure, thus creating the horizontal bonds shown in FIGS. 16A and 16B. The second set of chips, oriented at 90 degrees to the first set of chips, perform exactly the same routing and are operated in the same manner as the first chips when connecting neighboring NV/cavity systems to the north and south, thus creating the vertical bonds shown in FIGS. 16A and 16B. When one set of chips are being used for routing, the "beam-splitter/switches" in the other set are all set to "off" mode. This allows optical signals to simply bypass the layer of chips not being used for active routing for coupling operations. Individual NV-defect measurements are the same as described above, and either the upper or lower set of integrated optics chips can be used to route signals from the sources to the detectors (even though the sources and detectors themselves are connected to the upper layer.

The abstract arrangement of integrated optics just described may appear cumbersome, but it can be fabricated directly onto a combined structure in a more elegant (if not conceptually obvious manner). Again, these structures can be ordered and fabricated as off-the-shelf technology, made to specification to extremely high fidelity.

The above-described method of allowing for 2DNN connections in the chip enables switching between the 2DNN and LNN connection modes by simply permanently setting all switches/beam-splitters in the upper-set of chips to the "off" mode. When this upper array is permanently in the "off" mode, the system can connect NV/cavity systems in a LNN geometry, suitable for universal computation and when active can be used to allow for 2DNN geometric connections, suitable for fully error-corrected computation. Although a 2DNN geometric connectivity still can be used for universal, un-error corrected computation, there may be user-level motivation to restrict the geometric constraints of the architecture to LNN.

Complex Connection Geometries

While this document has detailed explicit designs for the integrated optics to allow for LNN and 2DNN connection geometries, more complex connections can be created, depending on the use cases. This is an explicit design element of this system and the same principles of embedded connection geometries and software control is a central design feature of the architecture. Applications for more complex connection geometries are, but not limited to:

Connection geometries suitable for quantum error correction code structures optimized specifically for information storage (active quantum memories), not computation.

Connection geometries suitable for error-correction protocols exclusively related to protocols known as state distillation. This would turn the computational system into a factory for highly purified "magic states." These magic states are used to complete universal, fault-tolerant gate sets for error-corrected computation. Possible operational models of a large-scale architecture is to provide a resource intensive factory for these particular quantum states to be further distributed to other quantum computing systems for them to achieve universality without dedicated physical resources for this intensive task.

Non-error corrected connection geometries optimized for specific quantum algorithms. It is known that qubit connectivity can change overall resource estimates for compiled quantum algorithms. Being able to change the connection geometry of this architecture "on-the-fly," by a software reconfiguration of the integrated optics network, would allow for more efficient use of available quantum resources.

Connection geometries for these applications may generally require long-range connectivity (NV/cavity systems coupled to others that may be is completely separate regions of the computer). This is largely dictated by the specific application(s) needed by the hardware. The 2DNN and LNN connection geometries are the most basic elements needed for both universal quantum computation and fully error corrected quantum computation, and these have been designed such that one is embedded within the other—allowing for software to configure two different modes of operation.

Comprise, include, and/or plural forms of each are open ended and include the listed parts and can include additional parts that are not listed. And/or is open ended and includes one or more of the listed parts and combinations of the listed parts.

One skilled in the art will realize the subject matter may be embodied in other specific forms without departing from the spirit or essential characteristics thereof. The foregoing embodiments are therefore to be considered in all respects illustrative rather than limiting of the subject matter described herein.

The invention claimed is:

1. A system for coupling Nitrogen Vacancy (NV)-defects in a quantum computing architecture, the system comprising:
a substantially isotopically pure diamond wafer comprising a plurality of separated implantation sites, at least a portion of which comprise a single NV-defect;
an optical cavity system coupled to the diamond wafer, the optical cavity system comprising a plurality of cavity sites aligned to the separated implantation sites;
an integrated optics system coupled to the optical cavity system, the integrated optics system comprising:
one or more optical waveguides and one or more switchable elements associated with each optical waveguide, one or more photon sources, one or more photon detectors, and one or more fiber optic connections coupled to one or more of: one of the photon sources, one of the photon detectors, and one or more of the switchable elements;
wherein one or more of the one or more optical waveguides, one or more switchable elements, one or more photon sources, one or more photon detectors, and one or more fiber optic connections of the integrated optics system are on a first chip module that is physically separate from the diamond wafer;
wherein the optical cavity comprises a cantilever mechanism comprising a cantilever which is part of a device layer, the cantilever configured to carry, at one end, one of the micro mirrors forming one side of one of the cavities, the cantilever attached, at an opposing end, to a handle layer via an oxide layer;
wherein a first one of the switchable elements of the first chip module couples a first pair of single NV-defects by splitting a beam emitted by one of the photon sources, via a first one of the optical waveguides, to the cavity sites aligned to the implantation sites of the first pair of single NV-defects; and
wherein a second one of the switchable elements of the first chip module couples a second pair of single NV-defects by splitting a beam emitted by one of the photon sources, via a second one of the optical waveguides, to the cavity sites aligned to the implantation sites of the second pair of single NV-defects.

2. The system of claim 1, wherein at least one of the switchable elements is a 50:50 beam splitter and at least one of the switchable elements is an optical switch.

3. The system of claim 1, wherein a first one of the photon detectors reads a signal reflected from the cavity sites of the optical cavity system aligned with the implantation sites of the first pair of single NV-defects and a second one of the photon detectors reads a signal reflected from the cavity sites of the optical cavity system aligned with the second pair of single NV-defects.

4. The system of claim 1, wherein the single NV-defects of the diamond wafer are connected in a Linear Nearest Neighbor (LNN) geometry by the first chip module.

5. The system of claim 1, wherein the integrated optics system comprises:
a second chip module comprising one or more optical waveguides and one or more switchable elements associated with each optical waveguide, one or more photon sources, one or more photon detectors, and one or more fiber optic connections coupled to one or more of: one of the photon sources, one of the photon detectors, and one or more of the switchable elements, wherein the second chip module is oriented at 90 degrees to the first chip module.

6. The system of claim 5, wherein the second chip module couples a third pair of single NV-defects by splitting a beam emitted by one of the photon sources, via one of the optical waveguides of the second chip module, to the cavity sites aligned to the implantation sites of the third pair of single NV-defects.

7. The system of claim 5, wherein the single NV-defects of the diamond wafer are connected in a two-dimensional Nearest Neighbor (2DNN) geometry by the second chip module.

8. The system of claim 1, wherein the first chip module configures the one or more switchable elements to enable measurement of a quantum state of one or more of the plurality of NV-defects.

9. The system of claim 1, wherein the first one of the switchable elements of the first chip module couples the first pair of adjacent separated NV-defects at a first timestep, and the second one of the switchable elements of the first chip module couples the second pair of adjacent separated NV-defects at a second timestep.

10. The system of claim 1, wherein at least one of the cavity sites is aligned to an implantation site comprising an unusable NV-defect.

11. The system of claim 1, wherein at least one of the cavity sites is aligned to an implantation site comprising two NV-defects.

12. The system of claim 1, wherein the optical cavity system comprises:
- a micro mirror chip with one or more curved micro mirrors, each micro mirror forming a lower end of one of the cavities; and
- a fiber optic mounting chip that sits vertically on top of the micro mirror chip and comprises one or more dielectric coatings forming an upper end of one of the cavities.

13. The system of claim 1, wherein the cantilever mechanisms are configured such that a voltage can be applied between the device layer and the handle layer in order to deflect the cantilever and tune a resonance frequency of the cavity.

14. The system of claim 1, comprising two or more mechanisms arranged in the micro mirror chip in the form of an array.

* * * * *